United States Patent
Sakai

(10) Patent No.: US 10,815,859 B2
(45) Date of Patent: Oct. 27, 2020

(54) CATALYST ABNORMALITY DIAGNOSTIC DEVICE AND CATALYST ABNORMALITY DIAGNOSTIC METHOD

(71) Applicant: SUBARU CORPORATION, Tokyo (JP)

(72) Inventor: Takashi Sakai, Tokyo (JP)

(73) Assignee: SUBARU CORPORATION, Tokyo (JP)

(*) Notice: Subject to any disclaimer, the term of this patent is extended or adjusted under 35 U.S.C. 154(b) by 140 days.

(21) Appl. No.: 16/015,478

(22) Filed: Jun. 22, 2018

(65) Prior Publication Data

US 2019/0040784 A1 Feb. 7, 2019

(30) Foreign Application Priority Data

Aug. 4, 2017 (JP) .................... 2017-151447

(51) Int. Cl.
| | |
|---|---|
| *F01N 11/00* | (2006.01) |
| *F02D 41/30* | (2006.01) |
| *F01N 13/00* | (2010.01) |
| *F01N 3/035* | (2006.01) |

(Continued)

(52) U.S. Cl.
CPC ........ *F01N 11/007* (2013.01); *B01D 53/9454* (2013.01); *B01D 53/9477* (2013.01);
(Continued)

(58) Field of Classification Search
CPC ............. F01N 13/009; F01N 2560/025; F01N 11/007; F01N 2550/02; F01N 2900/1602;
(Continued)

(56) References Cited

U.S. PATENT DOCUMENTS

| | | | |
|---|---|---|---|
| 9,261,007 B2* | 2/2016 | Aoki | F02D 41/1441 |
| 2012/0085084 A1* | 4/2012 | Bisaiji | F01N 11/007 |
| | | | 60/276 |

(Continued)

FOREIGN PATENT DOCUMENTS

| | | |
|---|---|---|
| JP | 2012-52461 A | 3/2012 |
| WO | 2010/150408 A1 | 12/2010 |
| WO | 2013/014788 A1 | 1/2013 |

OTHER PUBLICATIONS

Japanese Office Action issued for corresponding Application No. 2017-151447 dated Jan. 29, 2019.

*Primary Examiner* — Anthony Ayala Delgado
(74) *Attorney, Agent, or Firm* — Troutman Pepper Hamilton Sanders LLP

(57) ABSTRACT

A catalyst abnormality diagnostic device is configured to diagnose an abnormality of a first purification catalyst having an oxygen storage capacity and a second purification catalyst having the oxygen storage capacity and a function of a particulate filter provided on an exhaust passage on a downstream side of the first purification catalyst. The catalyst abnormality diagnostic device adjusts a fuel injection amount so that an air-fuel ratio of an exhaust gas is repeatedly in a rich state and a lean state, obtains a first determination value indicating a catalytic performance of the first purification catalyst, obtains a second determination value indicating a catalytic performance of the second purification catalyst, and determines whether there is an abnormality in one or both of the first purification catalyst and the second purification catalyst on the basis of the first determination value, the second determination value, and a predetermined determination reference value.

20 Claims, 13 Drawing Sheets

(51) Int. Cl.
*B01D 53/94* (2006.01)
*F01N 3/10* (2006.01)
*F02D 41/02* (2006.01)
*F02D 41/14* (2006.01)

(52) U.S. Cl.
CPC ............. *F01N 3/035* (2013.01); *F01N 3/101* (2013.01); *F01N 13/009* (2014.06); *F02D 41/0235* (2013.01); *F02D 41/3005* (2013.01); *F01N 2510/06* (2013.01); *F01N 2550/02* (2013.01); *F01N 2550/04* (2013.01); *F01N 2560/025* (2013.01); *F01N 2560/14* (2013.01); *F01N 2900/1624* (2013.01); *F02D 41/1441* (2013.01); *F02D 2200/0816* (2013.01)

(58) Field of Classification Search
CPC ..... F01N 2900/1621; F01N 2900/1622; F01N 3/0253; F01N 3/035; F01N 3/0821; F01N 3/0864; F01N 3/103; F01N 3/20; F01N 3/206; F01N 3/2892; F01N 9/00; F01N 9/002; F02D 2200/0816; F02D 41/0275; F02D 41/029; F02D 41/1441; F02D 41/1458
See application file for complete search history.

(56) References Cited

U.S. PATENT DOCUMENTS

2014/0208722 A1    7/2014   Mori et al.
2016/0230628 A1*   8/2016   Hokuto ................. F01N 3/0814

\* cited by examiner

CATALYST ABNORMALITY DIAGNOSTIC DEVICE AND CATALYST ABNORMALITY DIAGNOSTIC METHOD

CROSS-REFERENCE TO RELATED APPLICATIONS

The present application claims priority from Japanese Patent Application No. 2017-151447 filed on Aug. 4, 2017, the entire contents of which are hereby incorporated by reference.

BACKGROUND

1. Technical Field

The present invention relates to a catalyst abnormality diagnostic device and a catalyst abnormality diagnostic method.

2. Related Art

Exhaust passages of combustion engines have purification catalysts for purifying exhaust gases. Combustion engines that use gasoline as fuel may have exhaust passages with two three-way catalysts in order to comply with emission control over hazardous substances included in emission gases. When a three-way catalyst is mainly exposed to a high temperature, oxidation performance thereof is degraded or an oxygen storage capacity (OSC) thereof decreases due to coagulation of a noble metal carried by the three-way catalyst, and thereby reduction performance thereof may deteriorate.

With regard to the above-described problem, Japanese Unexamined Patent Application Publication No. 2012-52461, for example, discloses a technology in which, while a combustion engine is controlled such that an output value of an upstream exhaust sensor for a catalyst is modulated by a continuous wave to be rich or lean, the number of times an output value of a downstream exhaust sensor exceeds a downstream rich/lean determination level in a prescribed period of time is calculated as an inversion frequency of the downstream exhaust sensor, a frequency ratio is calculated on the basis of the inversion frequency and an inversion frequency of the upstream exhaust sensor in the prescribed period of time, and if the frequency ratio is higher than a preset degradation determination value, an exhaust gas purification catalyst is determined as being degraded.

Here, in the case in which the two three-way catalysts are three-way catalysts only functioning as catalysts, a temperature of the three-way catalyst on an upstream side significantly exceeds a temperature of the three-way catalyst on a downstream side in most of the time of an operation of the combustion engine. Thus, the three-way catalyst on the upstream side is more likely to be degraded than the three-way catalyst on the downstream side. Therefore, in a case in which the three-way catalyst on the upstream side of the two three-way catalysts is determined as not being degraded, the three-way catalyst on the downstream side can be regarded as not being degraded either. Also, since an oxygen storage capacity of the three-way catalyst on the upstream side is highly correlated with an exhaust purification capacity of the entire combustion engine, it is possible to ensure the exhaust purification capacity by diagnosing degradation of the three-way catalyst on the upstream side.

SUMMARY OF THE INVENTION

An aspect of the present invention provides a catalyst abnormality diagnostic device configured to diagnose an abnormality of a first purification catalyst having an oxygen storage capacity provided on an exhaust passage of a combustion engine and a second purification catalyst having the oxygen storage capacity and a function of a particulate filter provided on an exhaust passage on a downstream side of the first purification catalyst. The catalyst abnormality diagnostic device includes: a fuel injection controller configured to generate a diagnostic state by adjusting a fuel injection amount so that an air-fuel ratio of an exhaust gas is repeatedly in a rich state and a lean state; a first catalyst diagnostic module configured to obtain a first determination value indicating a catalytic performance of the first purification catalyst on the basis of a first state value related to an air-fuel ratio of an upstream part of the first purification catalyst and a second state value related to an air-fuel ratio of a downstream part of the first purification catalyst in the diagnostic state; a second catalyst diagnostic module configured to obtain a second determination value indicating a catalytic performance of the second purification catalyst on the basis of the first state value and a third state value related to an air-fuel ratio of a downstream part of the second purification catalyst in the diagnostic state; and an abnormality determination module configured to determine whether there is an abnormality in one or both of the first purification catalyst and the second purification catalyst on the basis of the first determination value, the second determination value, and a predetermined determination reference value.

An aspect of the present invention provides a catalyst abnormality diagnostic method of diagnosing an abnormality of a first purification catalyst having an oxygen storage capacity provided on an exhaust passage of a combustion engine and a second purification catalyst having the oxygen storage capacity and a function of a particulate filter provided on an exhaust passage on a downstream side of the first purification catalyst. The catalyst abnormality diagnostic method includes: generating a diagnostic state by adjusting a fuel injection amount so that an air-fuel ratio of an exhaust gas is repeatedly in a rich state and a lean state; obtaining a first determination value indicating a catalytic performance of the first purification catalyst on the basis of a first state value related to an air-fuel ratio of an upstream part of the first purification catalyst and a second state value related to an air-fuel ratio of a downstream part of the first purification catalyst in the diagnostic state; obtaining a second determination value indicating a catalytic performance of the second purification catalyst on the basis of the first state value and a third state value related to an air-fuel ratio of a downstream part of the second purification catalyst in the diagnostic state; and determining whether there is an abnormality in one or both of the first purification catalyst and the second purification catalyst on the basis of the first determination value, the second determination value, and a predetermined determination reference value.

An aspect of the present invention provides a catalyst abnormality diagnostic device configured to diagnose an abnormality of a first purification catalyst having an oxygen storage capacity provided on an exhaust passage of a combustion engine and a second purification catalyst having the oxygen storage capacity and a function of a particulate filter provided on an exhaust passage on a downstream side of the first purification catalyst. The catalyst abnormality diagnostic device includes circuitry configured to generate a diagnostic state by adjusting a fuel injection amount so that an air-fuel ratio of an exhaust gas is repeatedly in a rich state and a lean state, obtain a first determination value indicating a catalytic performance of the first purification catalyst on the basis of a first state value related to an air-fuel ratio of an upstream part of the first purification catalyst and a second state value related to an air-fuel ratio of a downstream part of the first purification catalyst in the diagnostic state, obtain a second determination value indicating a catalytic performance of the second purification catalyst on the basis of the first state value and a third state value related to an air-fuel ratio of a downstream part of the second purification catalyst in the diagnostic state, and determine whether there is an abnormality in one or both of the first purification catalyst and the second purification catalyst on the basis of the first determination value, the second determination value, and a predetermined determination reference value.

DETAILED DESCRIPTION

Figure 1:
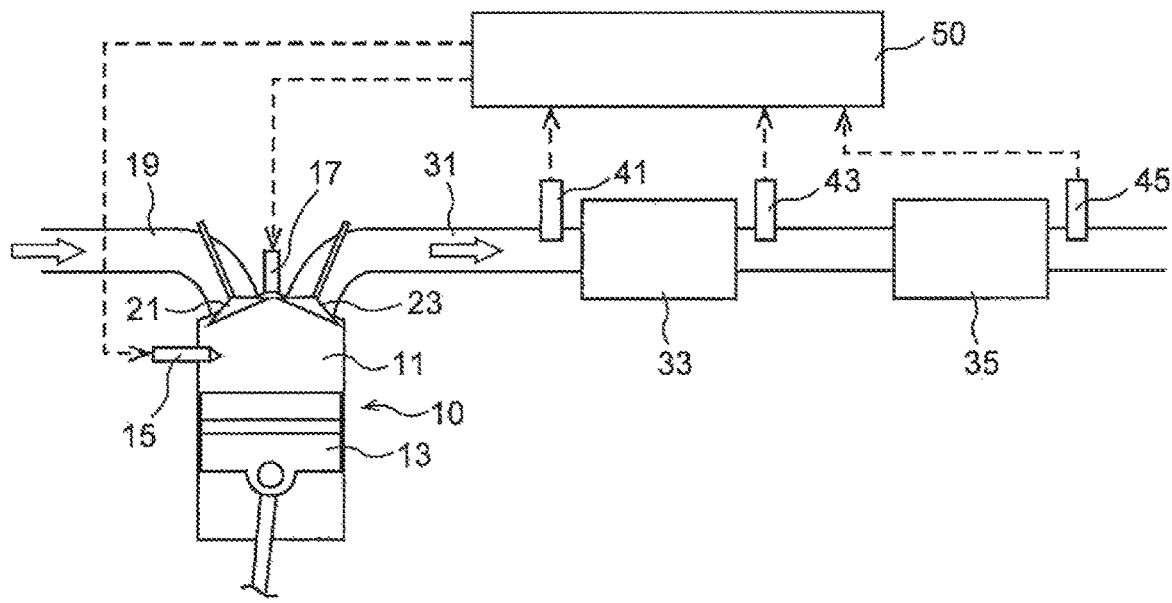
FIG. 1 is a schematic diagram illustrating an instance of a configuration of an exhaust gas purification system according to an example of the present invention.

Hereinafter, preferred examples of the present invention will be described in detail with reference to the appended drawings. Note that the following description is directed to illustrative examples of the present invention and not to be construed as limiting to the present invention. Factors including, without limitation, numerical values, shapes, materials, components, positions of the components, and how the components are coupled to each other are illustrative only and not to be construed as limiting to the present invention. Further, elements in the following examples which are not recited in a most-generic independent claim of the present invention are optional and may be provided on an as-needed basis. The drawings are schematic and are not intended to be drawn to scale. In the specification and the appended drawings, structural elements that have substantially the same function and structure are denoted with the same reference numerals, and repeated description of these structural elements is omitted.

In recent years, providing particulate filters that trap particulate matters included in exhaust gases in exhaust passages of combustion engines that use gasoline as fuel has been studied. As an aspect thereof, using a catalyst in which a catalyst component is carried by a particulate filter as a three-way catalyst on a downstream side among two three-way catalysts has been studied. When the particulate filter is exposed to high heat with particulate matters trapped, the trapped particulate matters begin to burn, and a temperature of the particulate filter abruptly increases. Then, the carried catalyst component is degraded, and therefore degradation of reduction performance progresses.

That is, in a case in which the particulate filter is caused to have the function of the three-way catalyst on the downstream side among the two three-way catalysts, the conventional characteristic that the three-way catalyst on the upstream side is more vulnerable to degradation than the three-way catalyst on the downstream side recedes, and therefore, only diagnosing degradation of the three-way catalyst provided on the upstream side is insufficient.

It is desirable to provide a novel and improved catalyst abnormality diagnostic device and catalyst abnormality diagnostic method which enable whether there is an abnormality in two purification catalysts to be determined in a case in which a purification catalyst in which a catalyst component is carried by a particulate filter is used as a downstream-side purification catalyst among the two purification catalysts provided in an exhaust passage.

<1. Instance of Configuration of Exhaust System of Combustion Engine>

First, an instance of a configuration of an exhaust system of a combustion engine to which a catalyst abnormality diagnostic device according to an example of the present invention can be applied will be described with reference to FIG. 1. The catalyst abnormality diagnostic device according to the present example is applied to an exhaust system of a combustion engine that uses gasoline as fuel.

The illustrated combustion engine 10 includes a combustion chamber 11, a piston 13, an intake valve 21, an exhaust valve 23, a fuel injection valve 15, and a spark plug 17. The piston 13 moves up and down in the combustion chamber 11. The intake valve 21 is provided between an intake passage 19 and the combustion chamber 11, and the exhaust valve 23 is provided between an exhaust passage 31 and the combustion chamber 11. The fuel injection valve 15 and the spark plug 17 are provided such that tips thereof face inside the combustion chamber 11. Power distribution to the fuel injection valve 15 and the spark plug 17 is controlled by a controller 50.

In the combustion engine 10, when the piston 13 moves down, the intake valve 21 is opened, then air intake from the intake passage 19 to the combustion chamber 11 is performed, and fuel is injected from the fuel injection valve 15 to form an air-fuel mixture in the combustion chamber 11 (intake stroke). When the piston 13 moves up next, the intake valve 21 is closed and the formed air-fuel mixture is compressed (compression stroke). The compressed air-fuel mixture is ignited by the spark plug 17 to expand and thereby the piston 13 is pushed down (expansion stroke). When the piston 13 moves up next, the exhaust valve 23 is opened and combustion gas (exhaust gas) is discharged to the exhaust passage 31 (exhaust stroke).

The exhaust passage 31 includes a first purification catalyst 33 and a second purification catalyst 35. The second purification catalyst 35 is provided on a downstream side of the first purification catalyst 33. The first purification catalyst 33 is a catalyst having an oxygen storage capacity in which, for example, a catalyst component is carried on a surface of a ceramic honeycomb carrier. The first purification catalyst 33 may have a washcoat formed together with or instead of the carrying of the catalyst component. The first purification catalyst 33 functions as, for example, a three-way catalyst and oxidizes or reduces hydrocarbons (HCs), carbon monoxide (CO), and nitrogen oxides ($NO_x$) included in the exhaust gas. The first purification catalyst 33, for example, adsorbs oxygen included in the exhaust gas when the exhaust gas is rich, releases the adsorbed oxygen when the exhaust gas is lean, and thereby decomposes HCs, CO, $NO_x$, and the like included in the exhaust gas.

The second purification catalyst 35 is a catalyst having the oxygen storage capacity and a function of a particulate filter (which will also be referred to as a gasoline particulate filter or GPF). The second purification catalyst 35 has a catalyst component carried on a surface of, for example, a ceramic honeycomb filter carrier. The second purification catalyst 35 may have a washcoat formed together with or instead of the carrying of the catalyst component. The second purification catalyst 35 functions as, for example, a three-way catalyst and oxidizes or reduces HCs, CO, and $NO_x$ included in the exhaust gas. The second purification catalyst 35, for example, adsorbs oxygen included in the exhaust gas when the exhaust gas is rich, releases the adsorbed oxygen when the exhaust gas is lean, and thereby decomposes HCs, CO, $NO_x$, and the like included in the exhaust gas. In addition, the second purification catalyst 35 traps particulate matters (PMs) included in the exhaust gas. The PMs trapped by the second purification catalyst 35 burn at a high temperature.

A first exhaust sensor 41 is provided on an upstream side of the first purification catalyst 33. A second exhaust sensor 43 is provided on a downstream side of the first purification catalyst 33 and an upstream side of the second purification catalyst 35. A third exhaust sensor 45 is provided on a downstream side of the second purification catalyst 35. Sensor signals of the first exhaust sensor 41, the second exhaust sensor 43, and the third exhaust sensor 45 are input to the controller 50.

Each of the first exhaust sensor 41, the second exhaust sensor 43, and the third exhaust sensor 45 is a sensor that detects a state value relating to an air-fuel ratio of a combustion gas. The first exhaust sensor 41, the second exhaust sensor 43, and the third exhaust sensor 45 are each, for example, air-fuel ratio sensors or oxygen concentration sensors. An air-fuel ratio sensor detects an air-fuel ratio (A/F) as a state value and an oxygen concentration sensor detects an oxygen concentration as a state value. The air-fuel ratio sensor may be a lambda sensor. A state value detected by an exhaust sensor, for example, decreases when an air-fuel ratio of an air-fuel mixture is in a rich state (a fuel excess state; the lambda value<1) rather than a stoichiometric state (a logical air-fuel ratio; the lambda value=1) and increases when the ratio is in a lean state (a fuel shortage state; the lambda value>1).

The exhaust system of the combustion engine 10 according to the present example decomposes HCs, CO, and $NO_x$ included in exhaust gas with the first purification catalyst 33 and the second purification catalyst 35 and traps PMs included in the exhaust gas with the second purification catalyst 35, and thereby purifies the exhaust gas.

Note that, although the one combustion chamber 11 is illustrated in FIG. 1, the combustion engine 10 may have a plurality of combustion chambers 11. In that case, if the combustion engine 10 has a plurality of banks each including the plurality of combustion chambers 11, the first purification catalyst 33, the second purification catalyst 35, the first exhaust sensor 41, the second exhaust sensor 43, and the third exhaust sensor 45 may be provided in each of the banks.

<2. Instance of Configuration of Catalyst Abnormality Diagnostic Device>

Next, an instance of a configuration of a catalyst abnormality diagnostic device according to the present example will be described. In the present example, the controller 50 functions as a catalyst abnormality diagnostic device.

Figure 2:
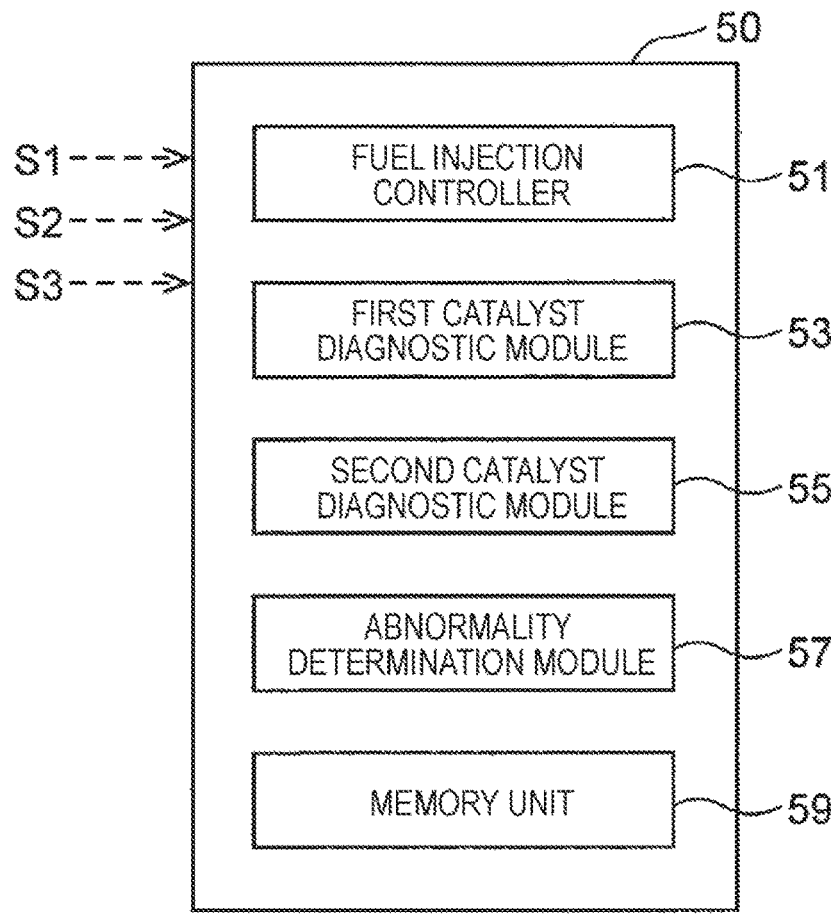
FIG. 2 is a block diagram illustrating an instance of a configuration of a catalyst abnormality diagnostic device according to the example.

FIG. 2 is a block diagram illustrating the instance of the configuration of the catalyst abnormality diagnostic device 50. The catalyst abnormality diagnostic device 50 includes a processor, for example, a central processing unit (CPU), a micro-processing unit (MPU), or the like. Part of or the entire catalyst abnormality diagnostic device 50 may be an upgradable one such as firmware or a program module or the like executed in accordance with a command from a CPU or the like.

The catalyst abnormality diagnostic device 50 includes a fuel injection controller 51, a first catalyst diagnostic module 53, a second catalyst diagnostic module 55, an abnormality determination module 57, and the memory unit 59. Among these, the fuel injection controller 51, the first catalyst diagnostic module 53, the second catalyst diagnostic module 55, and the abnormality determination module 57 are functions realized through execution of software programs by the processor. The catalyst abnormality diagnostic device 50 can acquire a sensor signal S1 of the first exhaust sensor 41, a sensor signal S2 of the second exhaust sensor 43, and a sensor signal S3 of the third exhaust sensor 45.

(Memory Unit)

The memory unit 59 includes a memory element of a random access memory (RAM) or a read only memory (ROM). The memory unit 59 may include another memory device such as a hard disk drive (HDD) or a storage device. The memory unit 59 stores a software program executed by the processor, various parameters used in arithmetic processing, state values corresponding to the acquired sensor signals S1, S2, and S3, or a result of arithmetic processing.

(Fuel Injection Controller)

The fuel injection controller 51 controls drive of the fuel injection valve 15 of the combustion engine 10 and controls fuel injection to the combustion chamber 11. For example, the fuel injection controller 51 obtains a fuel injection instruction amount on the basis of a rotation speed of the combustion engine 10 and required acceleration of a vehicle to control a power distribution time and a power distribution timing to be supplied to the fuel injection valve 15. In addition, when an abnormality of the first purification catalyst 33 and the second purification catalyst 35 is to be diagnosed, the fuel injection controller 51 generates a diagnostic state by adjusting a fuel injection amount so that an air-fuel ratio of exhaust gas emitted from the combustion engine 10 is repeatedly in a rich state and a lean state.

In a case in which the air-fuel ratio of exhaust gas is set to be in the rich state, the fuel injection controller 51 increases the fuel injection instruction amount. That is, a fuel injection adjustment amount has a positive value. In addition, in a case in which the air-fuel ratio of exhaust gas is set to be in a lean state, the fuel injection controller 51 decreases the fuel injection instruction amount. That is, the fuel injection adjustment amount has a negative value. The fuel injection controller 51 may adjust the fuel injection amount to be repeatedly in the rich state and the lean state at regular intervals. Accordingly, a signal-to-noise (S/N) ratio of a sensor signal of each exhaust sensor increases, and thus an abnormality can be easily diagnosed.

(First Catalyst Diagnostic Module)

The first catalyst diagnostic module 53 obtains a first determination value R1 indicating catalytic performance of the first purification catalyst 33 on the basis of a first state value D1 related to an air-fuel ratio of an upstream part of the first purification catalyst 33 and a second state value D2 related to an air-fuel ratio of a downstream part of the first purification catalyst 33 in the diagnostic state. The first state value D1 is a state value obtained on the basis of the sensor signal S1 of the first exhaust sensor 41, indicating, for example, an air-fuel ratio or an oxygen concentration. Since the air-fuel ratio of exhaust gas is repeatedly in the rich state and the lean state in the diagnostic state, the first state value D1 is repeatedly in the rich state and the lean state are repeated as if the value follows the fluctuations of the air-fuel ratio of the exhaust gas.

The second state value D2 is a state value obtained on the basis of the sensor signal S2 of the second exhaust sensor 43, indicating, for example, an air-fuel ratio or an oxygen concentration. In a state in which the first purification catalyst 33 is not degraded, the oxygen storage capacity of the first purification catalyst 33 is high and an amount of oxygen flowing out to the downstream side of the first purification catalyst 33 is small, and thus the second state value D2 continuously indicates the rich state. On the other hand, if degradation of the first purification catalyst 33 progresses, the oxygen storage capacity of the first purification catalyst 33 becomes lower and oxygen easily flows out to the downstream side of the first purification catalyst 33, and thus the second state value D2 is repeatedly in the rich state and the lean state. At this time, a period in which the rich state and the lean state switch becomes shorter as degradation of the first purification catalyst 33 progresses further.

The first catalyst diagnostic module 53 sets, for example, a ratio of the number of times the second state value D2 switches from the lean state to the rich state to the number of times the first state value D1 switches from the lean state to the rich state as the first determination value R1. In this case, the first determination value R1 indicates a larger value as degradation of the first purification catalyst 33 progresses further. The first determination value R1 may be a ratio of a wavelength of a trajectory of the second state value D2 to a wavelength of a trajectory of the first state value D1. In this case, the first determination value R1 indicates a smaller value as degradation of the first purification catalyst 33 progresses further. Furthermore, the first determination value R1 may be a ratio of an integral value of the second state value D2 to an integral value of the first state value D1. In this case, the first determination value R1 indicates a larger value as degradation of the first purification catalyst 33 progresses further. Note that, since there is a time difference between a change in the first state value D1 and a change in the second state value D2, the first state value D1 and the second state value D2 to be used in calculation of the first determination value R1 may be selected taking the time difference into account when the first determination value R1 is obtained.

(Second Catalyst Diagnostic Module)

The second catalyst diagnostic module 55 obtains a second determination value R2 indicating catalytic performance of the second purification catalyst 35 on the basis of the first state value D1 related to the air-fuel ratio of the upstream part of the first purification catalyst 33 and a third state value D3 related to an air-fuel ratio of a downstream part of the second purification catalyst 35 in the diagnostic state. The third state value D3 is a state value obtained on the basis of the sensor signal S3 of the third exhaust sensor 45, indicating, for example, an air-fuel ratio or an oxygen concentration. In a state in which at least the second purification catalyst 35 is not degraded, the oxygen storage capacity of the second purification catalyst 35 is high and an amount of oxygen flowing out to the downstream side of the second purification catalyst 35 is small, and thus the third state value D3 continuously indicates the rich state. On the other hand, if degradation of the second purification catalyst 35 progresses, the oxygen storage capacity of the second purification catalyst 35 becomes lower and oxygen easily flows out to the downstream side of the second purification catalyst 35, and thus the third state value D3 is likely to be repeatedly in the rich state and the lean state. At this time, a period in which the rich state and the lean state switch becomes shorter as degradation of the second purification catalyst 35 progresses further.

The second catalyst diagnostic module 55 sets, for example, a ratio of the number of times the third state value D3 switches from the lean state to the rich state to the number of times the first state value D1 switches from the lean state to the rich state as the second determination value R2. In this case, the second determination value R2 indicates a larger value as degradation of the second purification catalyst 35 progresses further. The second determination value R2 may be a ratio of a wavelength of the third state value D3 to a wavelength of the first state value D1. In this case, the second determination value R2 indicates a smaller value as degradation of the second purification catalyst 35 progresses further. Furthermore, the second determination value R2 may be a ratio of an integral value of the third state value D3 to an integral value of the first state value D1. In this case, the second determination value R2 indicates a larger value as degradation of the second purification catalyst 35 progresses further. Note that, since there is a time difference between a change in the first state value D1 and a change in the third state value D3, the first state value D1 and the third state value D3 to be used in calculation of the second determination value R2 may be selected taking the time difference into account when the second determination value R2 is obtained.

Note that, in a case in which a degree of degradation of the first purification catalyst 33 is small, a concentration of oxygen included in exhaust gas that arrives at the second purification catalyst 35 is low and thus it is difficult to reflect a degree of degradation of the second purification catalyst 35 in the third state value D3. In this case, a degree of degradation of the second purification catalyst 35 can be easily reflected in the third state value D3 by changing the fuel injection adjustment amount for generating a diagnostic state.

(Abnormality Determination Module)

The abnormality determination module 57 determines whether there is an abnormality in one or both of the first purification catalyst 33 and the second purification catalyst 35 on the basis of the first determination value R1, the second determination value R2, and a predetermined determination reference value R_thre. In a case in which the first determination value R1 exceeds the determination reference value R_thre and the second determination value R2 is equal to or smaller than the determination reference value, for example, the abnormality determination module 57 determines that performance of the first purification catalyst 33 has been degraded. In addition, in a case in which the second determination value R2 exceeds the determination reference value R_thre and the first determination value R1 is equal to or smaller than the determination reference value R_thre, the abnormality determination module 57 determines that performance of the second purification catalyst 35 has been degraded.

<3. Instance of Operation of Catalyst Abnormality Diagnostic Device>

Next, an instance of an operation of the catalyst abnormality diagnostic device 50 according to the present example will be described. A flow of a basic process of a catalyst abnormality diagnostic method performed by the catalyst abnormality diagnostic device 50 will be described, and then a specific instance of abnormality determination will be described.

(3-1. Basic Operation)

Figure 3:
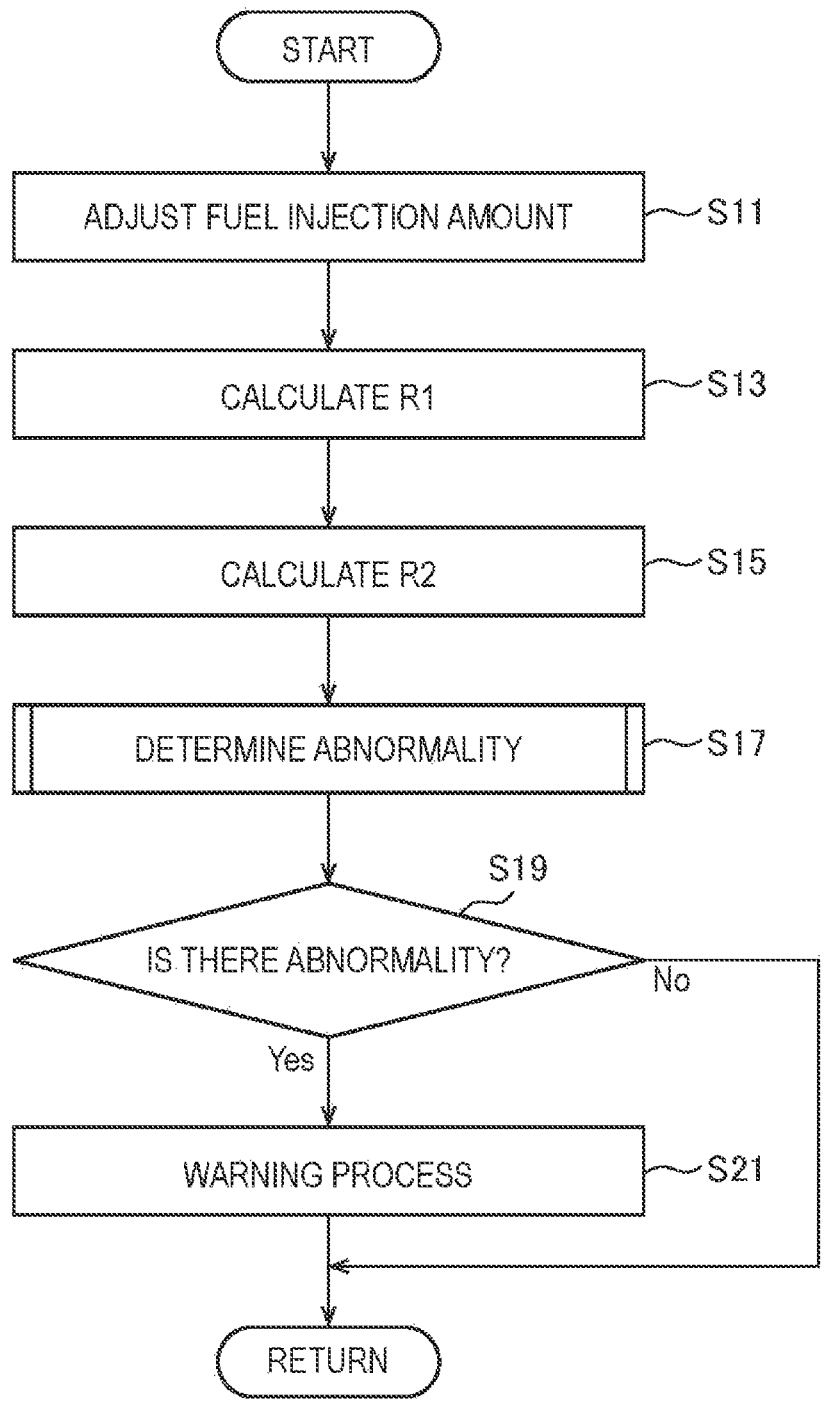
FIG. 3 is a flowchart illustrating an instance of a catalyst abnormality diagnostic method according to the example.

FIG. 3 is a flowchart illustrating an instance of a basic process of the catalyst abnormality diagnostic method performed by the catalyst abnormality diagnostic device 50. First, the fuel injection controller 51 of the catalyst abnormality diagnostic device 50 generates the diagnostic state by adjusting a fuel injection amount (Step S11). For example, the fuel injection controller 51 adds an adjustment amount having a positive value and an adjustment amount having a negative value set in advance to a fuel injection instruction amount calculated on the basis of the rotation speed of the combustion engine 10 and the required acceleration of the vehicle at regular intervals to perform control such that the air-fuel ratio of exhaust gas is repeatedly in the rich state and the lean state.

Next, the first catalyst diagnostic module 53 of the catalyst abnormality diagnostic device 50 obtains the first determination value R1 indicating catalytic performance of the first purification catalyst 33 on the basis of the first state value D1 obtained on the basis of the sensor signal 51 of the first exhaust sensor 41 and the second state value D2 obtained on the basis of the sensor signal S2 of the second exhaust sensor 43 (Step S13). For example, the first catalyst diagnostic module 53 sets a ratio of the number of times the second state value D2 switches from the lean state to the rich state to the number of times the first state value D1 switches from the lean state to the rich state as the first determination value R1.

Next, the second catalyst diagnostic module 55 of the catalyst abnormality diagnostic device 50 obtains the second determination value R2 indicating catalytic performance of the second purification catalyst 35 on the basis of the first state value D1 and the third state value D3 obtained on the basis of the sensor signal S3 of the third exhaust sensor 45 (Step S15). For example, the second catalyst diagnostic module 55 sets a ratio of the number of times the third state value D3 switches from the lean state to the rich state to the number of times the first state value D1 switches from the lean state to the rich state as the second determination value R2.

Returning to FIG. 3, the abnormality determination module 57 of the catalyst abnormality diagnostic device 50 determines whether there is an abnormality in one or both of the first purification catalyst 33 and the second purification catalyst 35 on the basis of the first determination value R1, the second determination value R2, and the determination reference value R_thre (Step S17). An instance of an abnormality determination method will be described below.

Next, the abnormality determination module 57 determines whether there is an abnormality in one or both of the first purification catalyst 33 and the second purification catalyst 35 (Step S19). In a case in which both of the first purification catalyst 33 and the second purification catalyst 35 are normal (No in S19), the catalyst abnormality diagnostic device 50 ends this routine with no further action. On the other hand, in a case in which there is an abnormality in one or both of the first purification catalyst 33 and the second purification catalyst 35 (Yes in S19), the abnormality determination module 57 performs a warning process to inform an operator or the like of the abnormality (Step S21). For example, the abnormality determination module 57 may perform the warning process by turning on a warning lamp included in an instrument panel, sounding an alarm, or displaying a warning on a display device. Then, the catalyst abnormality diagnostic device 50 ends the routine. At this time, the abnormality determination module 57 may shift drive control of the combustion engine 10 to a fail safe mode.

(3-2. Specific Instance of Abnormality Determination Process)

A few specific instances of the above-described abnormality determination process executed in Step S17 will be described below.

(First Instance)

Figure 4:
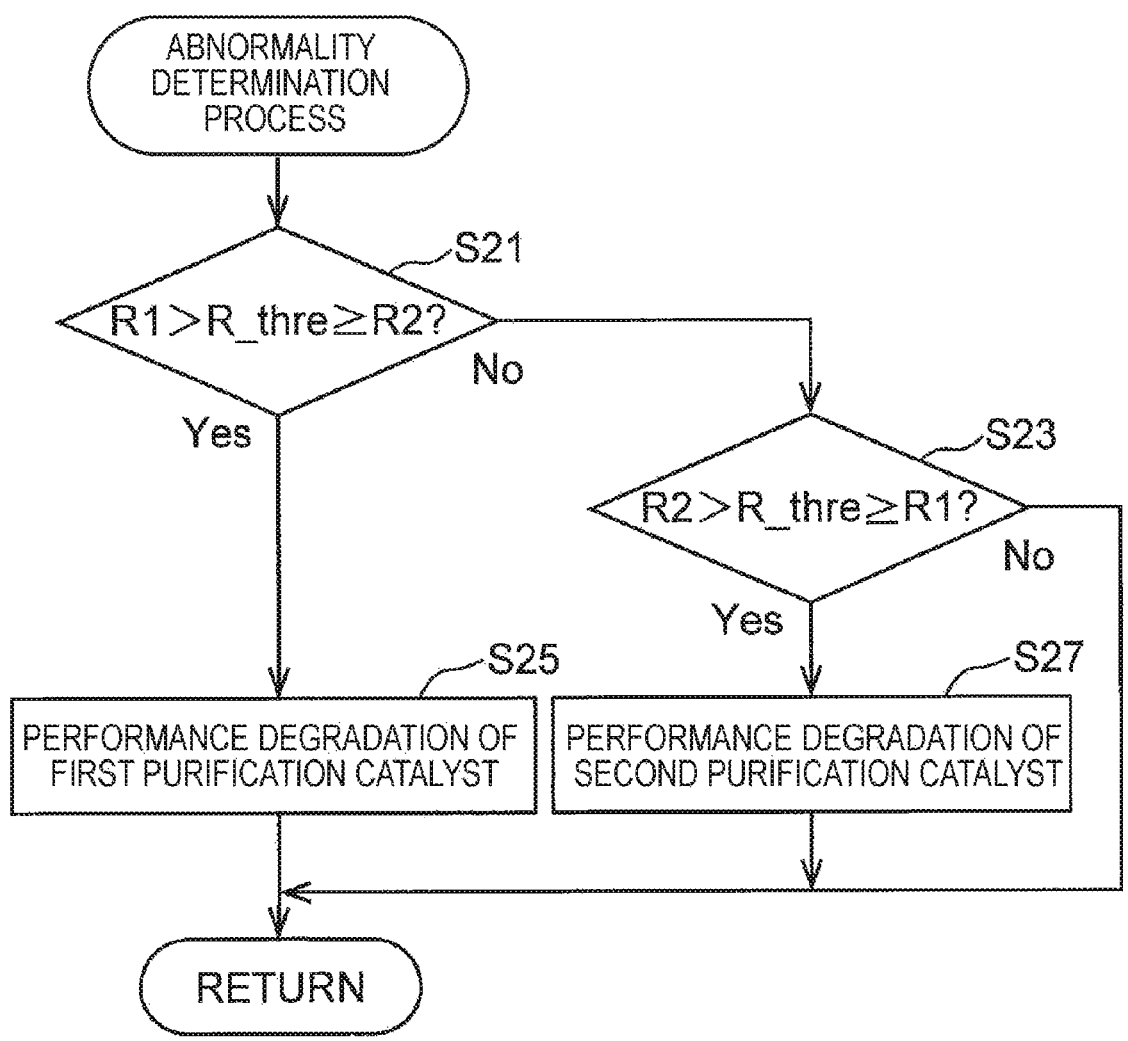
FIG. 4 is a flowchart illustrating a first instance of an abnormality determination process of the catalyst abnormality diagnostic method according to the example.

FIG. 4 is a flowchart illustrating a first instance of the abnormality determination process. First, the abnormality determination module 57 determines whether the first determination value R1 exceeds the determination reference value R_thre and the second determination value R2 is equal to or smaller than the determination reference value R_thre (Step S21). In the case in which the relation of R1>R_thre≥R2 is satisfied (Yes in S21), the abnormality determination module 57 determines that performance of the first purification catalyst 33 has been degraded (Step S25).

On the other hand, in a case in which the relation of R1>R_thre≥R2 is not satisfied (No in S21), the abnormality determination module 57 determines whether the second determination value R2 exceeds the determination reference value R_thre and the first determination value R1 is equal to or smaller than the determination reference value R_thre (Step S23). In the case in which the relation of R2>R_thre≥R1 is satisfied (Yes in S23), the abnormality determination module 57 determines that performance of the second purification catalyst 35 has been degraded (Step S27). On the other hand, in a case in which the relation of R2>R_thre≥R1 is not satisfied (No in S23), the abnormality determination module 57 determines that neither the first purification catalyst 33 nor the second purification catalyst 35 is abnormal and ends the abnormality determination process.

Figure 5:
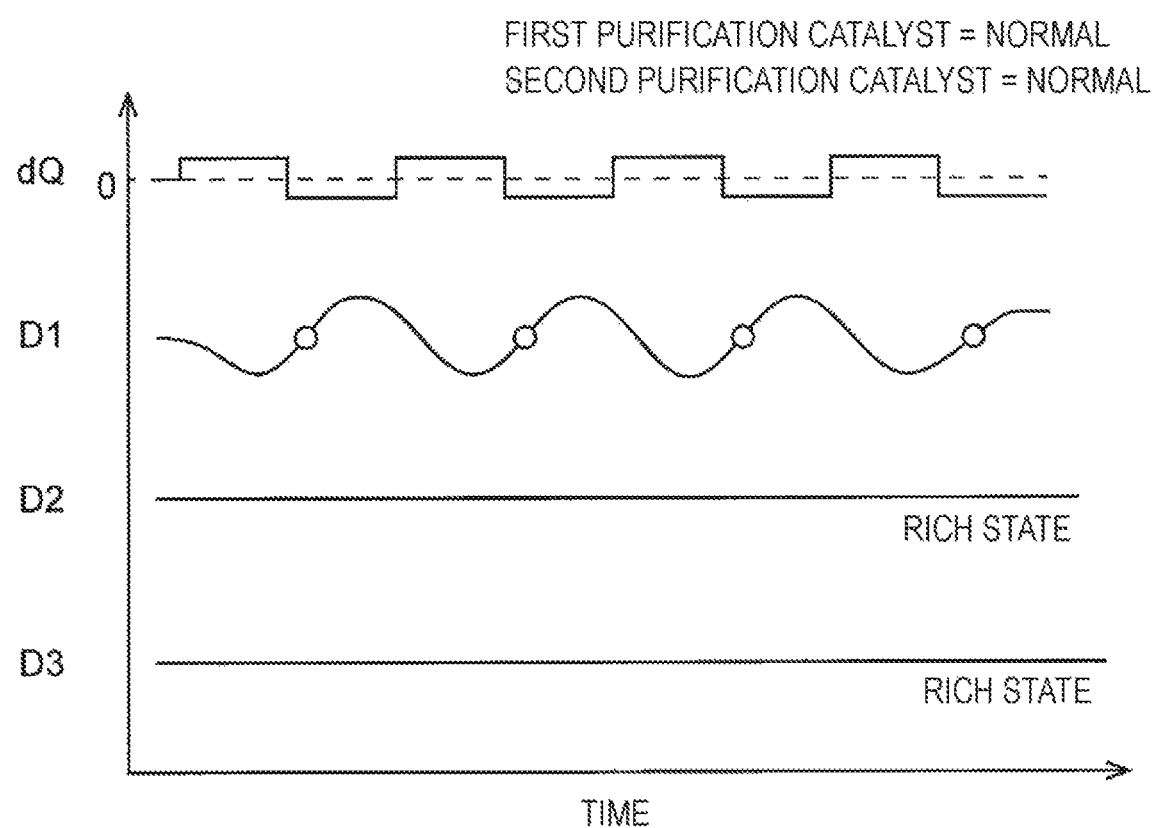
FIG. 5 is an explanatory diagram illustrating sensor values in a case in which both a first purification catalyst and a second purification catalyst are normal.
Figure 6:
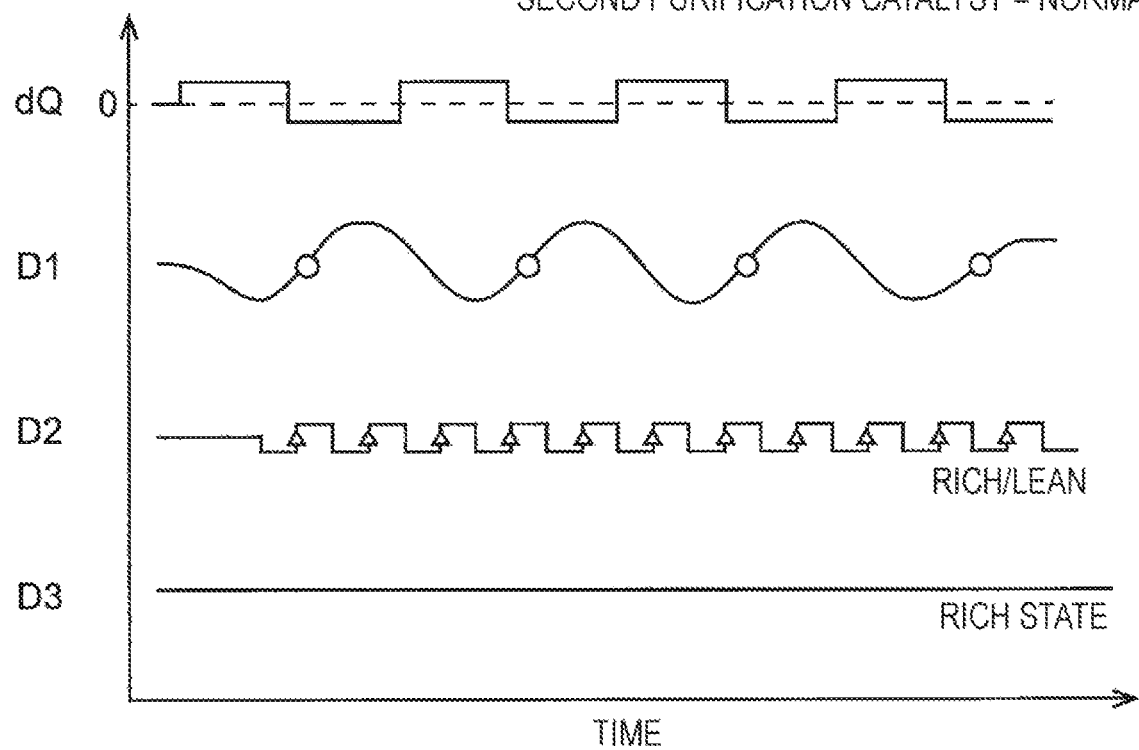
FIG. 6 is an explanatory diagram illustrating sensor values in a case in which the first purification catalyst exhibits performance degradation and the second purification catalyst is normal.
Figure 7:
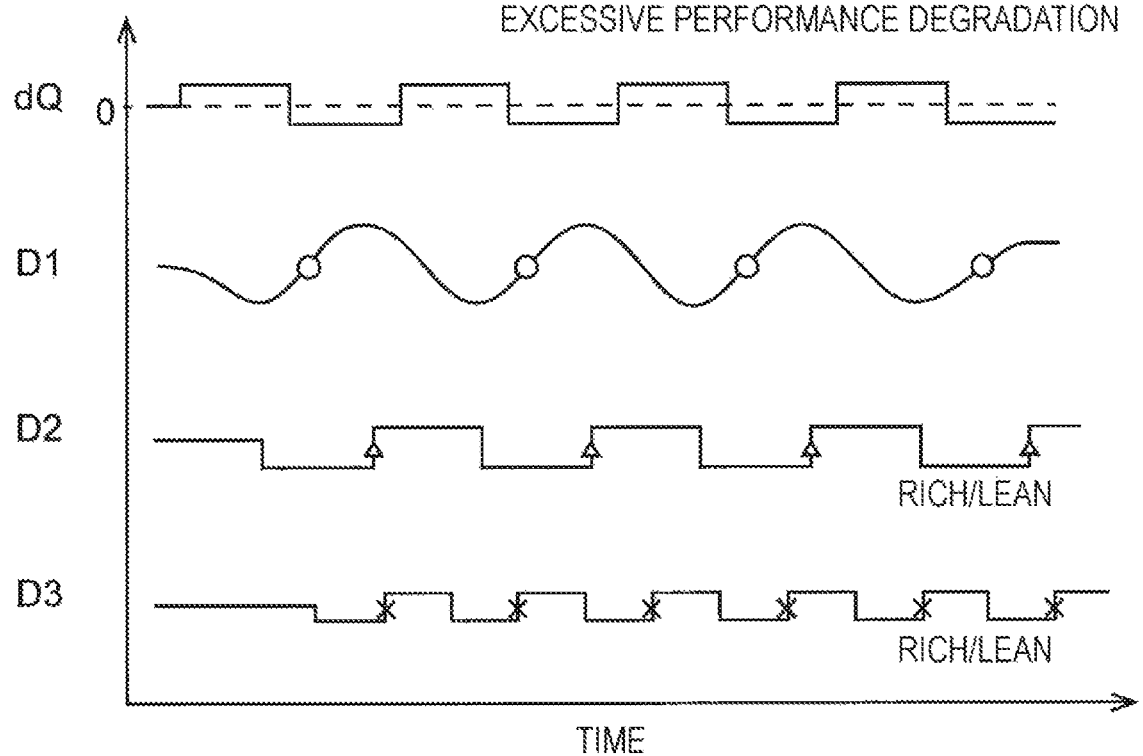
FIG. 7 is an explanatory diagram illustrating sensor values in a case in which both the first purification catalyst and the second purification catalyst exhibit performance degradation.

Here, differences in the first state value D1, the second state value D2, and the third state value D3 depending on the presence of an abnormality of the first purification catalyst 33 and the second purification catalyst 35 will be described with reference to FIG. 5 to FIG. 7. FIG. 5 to FIG. 7 each schematically illustrate progress of a fuel injection adjustment amount dQ, the first state value D1, the second state value D2, and the third state value D3 over time.

FIG. 5 illustrates a case in which both of the first purification catalyst 33 and the second purification catalyst 35 are normal. If the fuel injection adjustment amount dQ is set to repeatedly have a positive value and a negative value at regular intervals, the first state value D1 detected by the first exhaust sensor 41 provided at the upstream part of the first purification catalyst 33 repeatedly increases or decreases in accordance with switches of the air-fuel ratio of exhaust gas between the rich state and the lean state. In a case in which the first purification catalyst 33 is normal, the amount of oxygen flowing out to the downstream side of the first purification catalyst 33 is very small, and thus the second state value D2 detected by the second exhaust sensor 43 provided at the downstream part of the first purification catalyst 33 is maintained at a value indicating the rich state.

In addition, the fact that the amount of oxygen flowing out to the downstream side of the first purification catalyst 33 is very small means that the amount of oxygen that arrives at the second purification catalyst 35 is very small. In addition, in a case in which the second purification catalyst 35 is normal, the amount of oxygen flowing out to the downstream side of the second purification catalyst 35 is very small, and thus the third state value D3 detected by the third exhaust sensor 45 provided at the downstream part of the second purification catalyst 35 is maintained at a value indicating the rich state.

That is, in a case in which both of the first purification catalyst 33 and the second purification catalyst 35 are normal, while the first state value D1 repeatedly increases and decreases in accordance with states of the air-fuel ratio of exhaust gas, the second state value D2 and the third state value D3 are maintained at values indicating the rich state. The first determination value R1 that is a ratio of the number of times the second state value D2 switches from the lean state to the rich state to the number of times the first state value D1 switches from the lean state to the rich state (the number of white circles in the drawing) has a very small value. In addition, the second determination value R2 that is a ratio of the number of times the third state value D3 switches from the lean state to the rich state to the number of times the first state value D1 switches from the lean state to the rich state (the number of white circles in the drawing) has a very small value. Therefore, both of the first determination value R1 and the second determination value R2 have values equal to or smaller than the pre-set determination reference value R_thre, and therefore both of the first purification catalyst 33 and the second purification catalyst 35 are determined to be normal. Note that the determination reference value R_thre is set to an appropriate value within an allowable range of degradation of the purification catalysts.

FIG. 6 illustrates a case in which, while performance of the first purification catalyst 33 has been excessively degraded, the second purification catalyst 35 is normal. If the fuel injection adjustment amount dQ is set to repeatedly have a positive value and a negative value at regular intervals, the first state value D1 detected by the first exhaust sensor 41 provided at the upstream part of the first purification catalyst 33 repeatedly increases or decreases in accordance with switches of the air-fuel ratio of exhaust gas between the rich state and the lean state. In a case in which performance of the first purification catalyst 33 has been excessively degraded, the oxygen storage capacity of the first purification catalyst 33 is reduced, and the outflow of oxygen to the downstream side of the first purification catalyst 33 is repeated. Thus, the second state value D2 detected by the second exhaust sensor 43 provided at the downstream part of the first purification catalyst 33 repeatedly has a value indicating the rich state and a value indicating the lean state.

In addition, if the second purification catalyst 35 is normal while oxygen flows out to the downstream side of the first purification catalyst 33 when performance of the first purification catalyst 33 is excessively degraded, the amount of oxygen flowing out to the downstream side of the second purification catalyst 35 is very small. Thus, the third state value D3 detected by the third exhaust sensor 45 provided at the downstream part of the second purification catalyst 35 is maintained at a value indicating the rich state.

That is, in the case in which performance of the first purification catalyst 33 has been excessively degraded and the second purification catalyst 35 is normal, the first state value D1 repeatedly increases and decreases in accordance with states of the air-fuel ratio of exhaust gas, and the second state value D2 repeatedly increases and decreases at a shorter period than that of the first state value D1. In addition, the third state value D3 is maintained at the value indicating the rich state. The first determination value R1 that is the ratio of the number of times the second state value D2 switches from the lean state to the rich state (the number of triangles in the drawing) to the number of times the first state value D1 switches from the lean state to the rich state (the number of white circles in the drawing) has a value greater than that in the instance of FIG. 5. In addition, the second determination value R2 that is a ratio of the number of times the third state value D3 switches from the lean state to the rich state to the number of times the first state value D1 switches from the lean state to the rich state (the number of white circles in the drawing) has a very small value. Therefore, while the first determination value R1 exceeds the pre-set determination reference value R_thre, the second determination value R2 is a value equal to or smaller than the determination reference value R_thre, and thus it is determined that performance of the first purification catalyst 33 has been degraded.

FIG. 7 illustrates a case in which performance of the first purification catalyst 33 has been slightly degraded, and performance of the second purification catalyst 35 has been excessively degraded. If the fuel injection adjustment amount dQ is set to repeatedly have a positive value and a negative value at regular intervals, the first state value D1 detected by the first exhaust sensor 41 provided at the upstream part of the first purification catalyst 33 repeatedly increases or decreases in accordance with switches of the air-fuel ratio of exhaust gas between the rich state and the lean state. In a case in which performance of the first purification catalyst 33 has been slightly degraded, in accordance with a reduction in the oxygen storage capacity of the first purification catalyst 33, the outflow of a small amount of oxygen to the downstream side of the first purification catalyst 33 is repeated. Thus, the second state value D2 detected by the second exhaust sensor 43 provided at the downstream part of the first purification catalyst 33 repeatedly has a value indicating the rich state and a value indicating the lean state.

In addition, in the case in which performance of the second purification catalyst 35 has been excessively degraded, the oxygen storage capacity of the second purification catalyst 35 is reduced and some or all of the oxygen flowing out to the downstream side of the first purification catalyst 33 flows out to the downstream side of the second purification catalyst 35. Thus, the third state value D3 detected by the third exhaust sensor 45 provided at the downstream part of the second purification catalyst 35 repeatedly has a value indicating the rich state and a value indicating the lean state. At this time, since the degree of degradation of the second purification catalyst 35 is greater than the degree of degradation of the first purification catalyst 33, the third state value D3 repeatedly increases and decreases at a shorter period than that of the second state value D2.

That is, in a case in which performance of the first purification catalyst 33 has been slightly degraded and performance of the second purification catalyst 35 has been excessively degraded, the first state value D1 repeatedly increases and decreases in accordance with states of the air-fuel ratio of exhaust gas and the second state value D2 and the third state value D3 repeatedly increase and decrease. Thus, the first determination value R1 that is the ratio of the number of times the second state value D2 switches from the lean state to the rich state (the number of triangles in the drawing) to the number of times the first state value D1 switches from the lean state to the rich state (the number of white circles in the drawing) has a value greater than that in the instance of FIG. 5. In addition, the second determination value R2 that is the ratio of the number of times the third state value D3 switches from the lean state to the rich state (the number of X symbols in the drawing) to the number of times the first state value D1 switches from the lean state to the rich state (the number of white circles in the drawing) has a value greater than that in the instance of FIG. 5.

In a case in which a degree of degradation of the second purification catalyst 35 is greater than a degree of degradation of the first purification catalyst 33, a period in which the third state value D3 repeatedly increases and decreases is shorter than a period in which the second state value D2 repeatedly increases and decreases. That is, the number of times the third state value D3 switches from the lean state to the rich state (the number of X symbols in the drawing) is larger than the number of times the second state value D2 switches from the lean state to the rich state (the number of triangles in the drawing). Therefore, while the second determination value R2 exceeds the pre-set determination reference value R_thre, the first determination value R1 is a value equal to or smaller than the determination reference value R_thre, and thus it is determined that performance of the second purification catalyst 35 has been degraded.

Note that, in a case in which performance of the second purification catalyst 35 is determined to have been degraded after performance of the first purification catalyst 33 is determined to have been degraded, or in a case in which performance of the first purification catalyst 33 is determined to have been degraded after performance of the second purification catalyst 35 is determined to have been degraded through repetitive execution of the abnormality determination process, the abnormality determination module 57 may confirm whether both or either of the first purification catalyst 33 and the second purification catalyst 35 are abnormal by continuously executing the abnormality determination process.

(Second Instance)

In the above-described instance illustrated in FIG. 7, in a case in which performance of the first purification catalyst 33 has been very slightly degraded, if an amount of oxygen that arrives at the second purification catalyst 35 is small, the oxygen storage capacity of the second purification catalyst 35 may be hardly reflected on the third state value D3. In that case, the fuel injection adjustment amount dQ may be changed so that the amount of oxygen that arrives at the second purification catalyst 35 increases.

Figure 8:
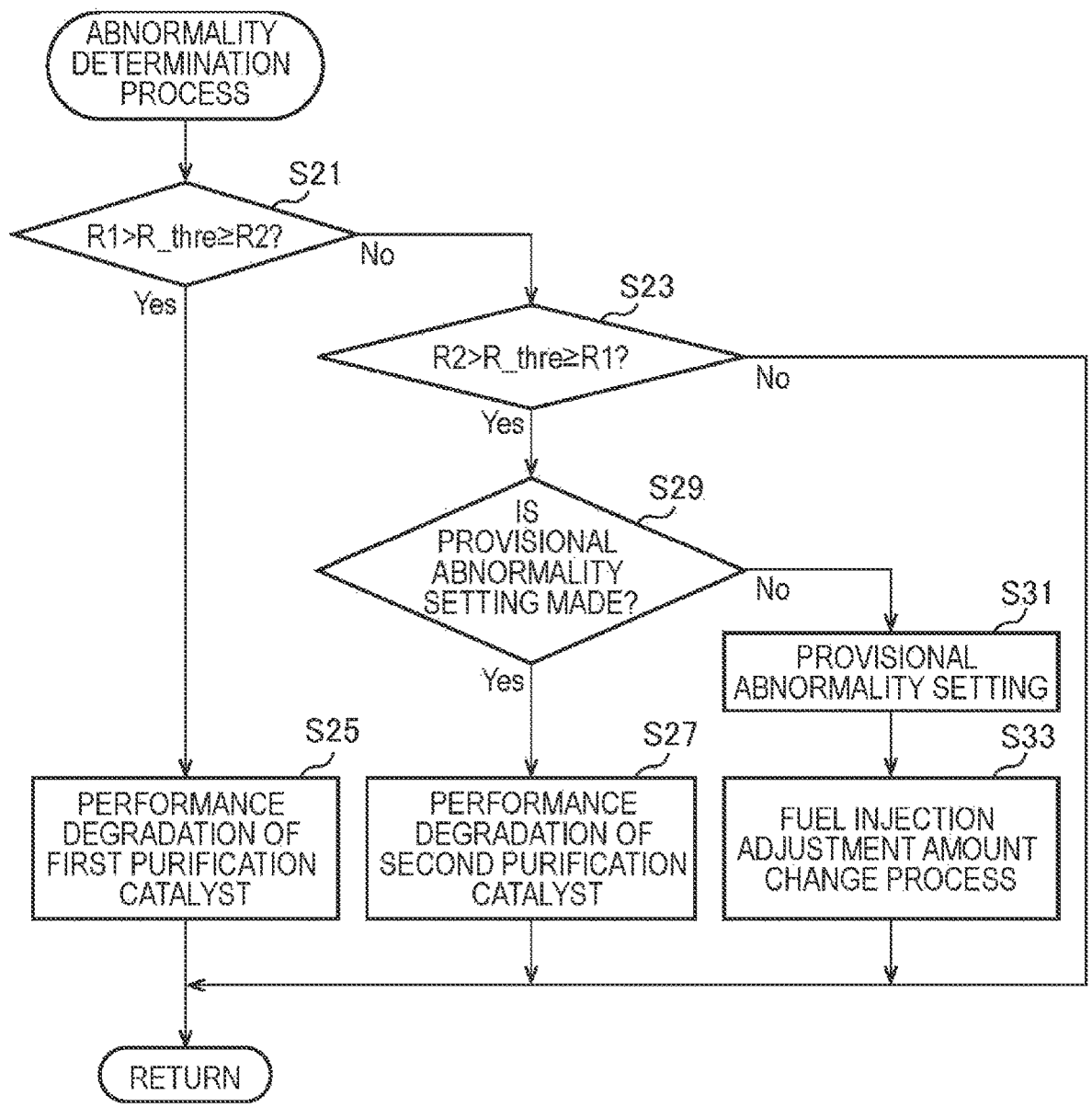
FIG. 8 is a flowchart illustrating a second instance of the abnormality determination process of the catalyst abnormality diagnostic method according to the example.

FIG. 8 is a flowchart illustrating a second instance of the abnormality determination process. First, the abnormality determination module 57 determines whether the first determination value R1 exceeds the determination reference value R_thre and the second determination value R2 is equal to or smaller than the determination reference value R_thre (Step S21). In the case in which the relation of R1>R_thre≥R2 is satisfied (Yes in S21), the abnormality determination module 57 determines that performance of the first purification catalyst 33 has been degraded (Step S25).

On the other hand, in a case in which the relation of R1>R_thre≥R2 is not satisfied (No in S21), the abnormality determination module 57 determines whether the second determination value R2 exceeds the determination reference value R_thre and the first determination value R1 is equal to or smaller than the determination reference value R_thre (Step S23). In a case in which the relation of R2>R_thre≥R1 is not satisfied (No in S23), the abnormality determination module 57 determines that neither the first purification catalyst 33 nor the second purification catalyst 35 is abnormal and ends the abnormality determination process.

On the other hand, in the case in which the relation of R2>R_thre≥R1 is satisfied in the second instance (Yes in S23), the abnormality determination module 57 determines whether a provisional abnormality setting for performance degradation of the second purification catalyst 35 is made (Step S29). The provisional abnormality setting is information set in Step S31, and is made in a case in which it is once determined that there is concern about performance of the second purification catalyst 35 being degraded. In a case in which the provisional abnormality setting is not made (No in S29), the abnormality determination module 57 regards that there is concern about performance of the second purification catalyst 35 being degraded, and thus makes the provisional abnormality setting (Step S31). For example, the abnormality determination module 57 may perform a process of setting a provisional abnormality flag.

Next, the abnormality determination module 57 changes the fuel injection adjustment amount dQ in order to execute abnormality diagnosis by increasing the amount of oxygen that arrives at the second purification catalyst 35 (Step S33). For example, the abnormality determination module 57 may determine whether there is an abnormality in the second purification catalyst 35 again by lowering an average value of the fuel injection adjustment amount dQ. As the average value of the fuel injection adjustment amount dQ is lowered, the air-fuel ratio of exhaust gas slides to the lean side as a whole, the amount of oxygen included in the exhaust gas thus increases, the amount of oxygen that arrives at the second purification catalyst 35 increases, and therefore the abnormality diagnosis of the second purification catalyst 35 can be readily performed.

In addition, the abnormality determination module 57 may determine whether there is an abnormality in the second purification catalyst 35 again by enlarging the difference between the fuel injection adjustment amount dQ in the rich state and the fuel injection adjustment amount dQ in the lean state. By enlarging the range in which the adjustment amount dQ increases and decreases, the wavelength of state values detected by the exhaust sensors in the rich state and the lean state of exhaust gas becomes longer or the number of switches increases, and thus the abnormality diagnosis of the second purification catalyst 35 can be readily performed.

In addition, the abnormality determination module 57 may determine whether there is an abnormality in the second purification catalyst 35 again by switching the fuel injection adjustment amounts dQ so that a period in which the rich state and the lean state of exhaust gas are repeated is enlarged. By enlarging the period in which the rich state and the lean state of exhaust gas are repeated, the wavelength of state values detected by the exhaust sensors in the rich state and the lean state of exhaust gas becomes longer or the number of switches increases, and thus the abnormality diagnosis of the second purification catalyst 35 can be readily performed.

In a case in which the relation of R2>R_thre≥R1 is satisfied again in Step S2 (Yes in S23) after passing through Step S31 and Step S33, the abnormality determination module 57 determines that the provisional abnormality setting is made in Step S29 (Yes in S29) and confirms that the performance of the second purification catalyst 35 has been degraded (Step S27). That is, in the second instance of the abnormality determination process, in the case in which the degree of degradation of the first purification catalyst 33 is small, the presence of an abnormality in the second purification catalyst 35 is determined by changing the fuel injection adjustment amount dQ so that a clearer determination result is obtained, and therefore reliability of the abnormality diagnosis result of the second purification catalyst 35 can be improved.

Figure 9:
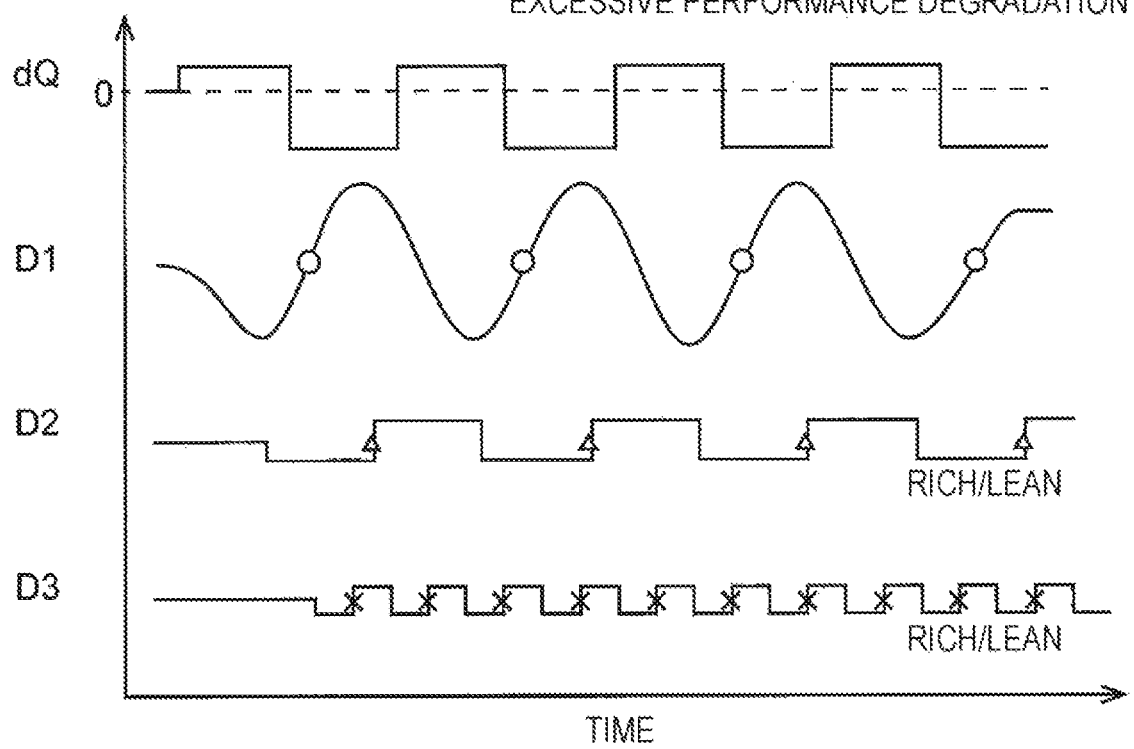
FIG. 9 is an explanatory diagram illustrating sensor values in a case in which a fuel injection adjustment amount has been changed.

FIG. 9 illustrates a case in which the fuel injection adjustment amount dQ is changed from the instance of FIG. 7. In the instance illustrated in FIG. 9, a decreased range of the adjustment amount dQ when the fuel injection adjustment amount dQ is set to a negative value is larger than that in the instance of FIG. 7. Accordingly, the average value of the fuel injection adjustment amount dQ is lowered further than that of the instance of FIG. 7, and the range in which the fuel injection adjustment amount dQ increases and decreases is enlarged. Thereby, the range in which the first state value D1 detected by the first exhaust sensor 41 provided at the upstream part of the first purification catalyst 33 increases and decreases is enlarged.

The amount of oxygen flowing into the first purification catalyst 33 increases as a result of the change of the fuel injection adjustment amount dQ and thus even in a case in which the degree of degradation of the first purification catalyst 33 is small, the amount of oxygen that arrives at the second purification catalyst 35 can be increased. Thus, the wavelength of the third state value D3 detected by the third exhaust sensor 45 provided on the downstream side of the second purification catalyst 35 becomes shorter or the number of switches of the states becomes larger. As a result, abnormality diagnosis of the second purification catalyst 35 is readily performed and reliability of the determination result of the presence of an abnormality can be improved.

(Third Instance)

Figure 10:
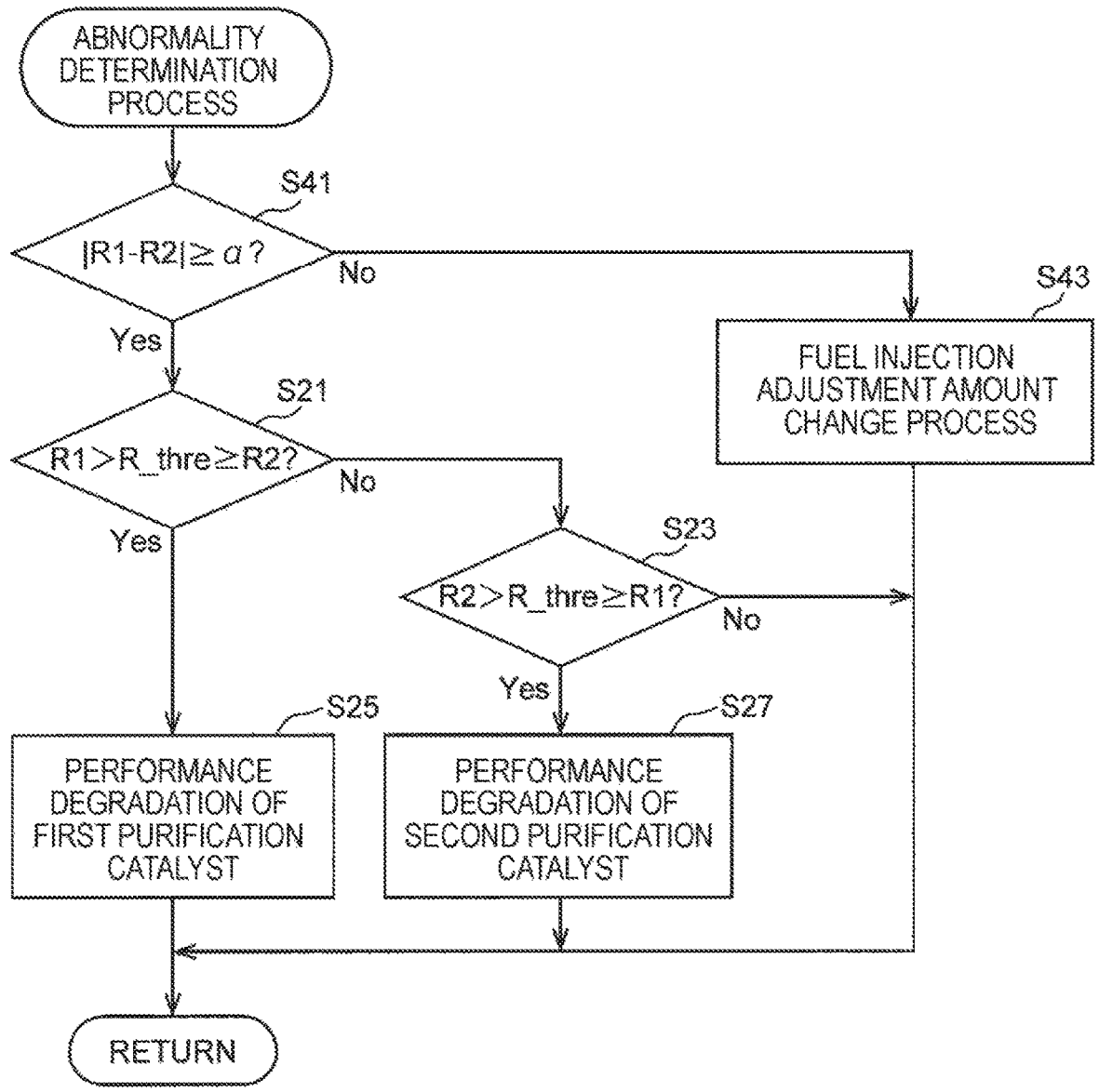
FIG. 10 is a flowchart illustrating a third instance of the abnormality determination process of the catalyst abnormality diagnostic method according to the example.

FIG. 10 is a flowchart illustrating a third instance of the abnormality determination process. As described in the second instance, in the case in which the degree of degradation of the first purification catalyst 33 is small, the amount of oxygen that arrives at the second purification catalyst 35 becomes small, and thus there is concern of reliability in diagnosis of an abnormality of the second purification catalyst 35 deteriorating. In this case, a trajectory of change of the second state value D2 detected by the second exhaust sensor 43 provided at the downstream part of the first purification catalyst 33 approximates to a trajectory of change of the third state value D3 detected by the third exhaust sensor 45 provided at the downstream part of the second purification catalyst 35, and a difference between the first determination value R1 and the second determination value R2 becomes small. Thus, in the case in which the difference between the first determination value R1 and the second determination value R2 is small in the third instance, the fuel injection adjustment amount dQ is changed.

First, the abnormality determination module 57 determines whether the absolute value of the difference between the first determination value R1 and the second determination value R2 is larger than or equal to a pre-set threshold value (a first threshold value) a (Step S41). The threshold value α is set to an appropriate value in advance so that abnormality diagnosis of the second purification catalyst 35 is appropriately performed. In a case in which the absolute value of the difference between the first determination value R1 and the second determination value R2 is larger than or equal to the threshold value α (Yes in S41), the abnormality determination module 57 determines whether there is an abnormality in the first purification catalyst 33 and the second purification catalyst 35 following the procedure described with reference to FIG. 4 (Step S21 to Step S27). On the other hand, in a case in which the absolute value of the difference between the first determination value R1 and the second determination value R2 is less than the threshold value α (No in S41), the abnormality determination module 57 changes the fuel injection adjustment amount dQ in order to execute abnormality diagnosis by increasing the amount of oxygen that arrives at the second purification catalyst 35 (Step S43).

The abnormality determination module 57 may determine whether there is an abnormality in the second purification catalyst 35 again, for example, by lowering the average value of the fuel injection adjustment amount dQ similarly to the above-described Step S33. In addition, the abnormality determination module 57 may determine whether there is an abnormality in the second purification catalyst 35 again by enlarging the difference between the fuel injection adjustment amount dQ in the rich state and the fuel injection adjustment amount dQ in the lean state. Alternatively, the abnormality determination module 57 may determine whether there is an abnormality in the second purification catalyst 35 again by switching the fuel injection adjustment amounts dQ so that the period in which the rich state and the lean state of exhaust gas are repeated is enlarged.

Also in the third instance, the amount of oxygen flowing into the first purification catalyst 33 increases as a result of the change of the fuel injection adjustment amount dQ and thus even in the case in which the degree of degradation of the first purification catalyst 33 is small, the amount of oxygen that arrives at the second purification catalyst 35 can be increased. Thus, the wavelength of the third state value D3 detected by the third exhaust sensor 45 provided on the downstream side of the second purification catalyst 35 becomes shorter or the number of switches of the states becomes larger. As a result, abnormality diagnosis of the second purification catalyst 35 is readily performed and reliability of the determination result of the presence of an abnormality can be improved.

(Fourth Instance)

Figure 11:
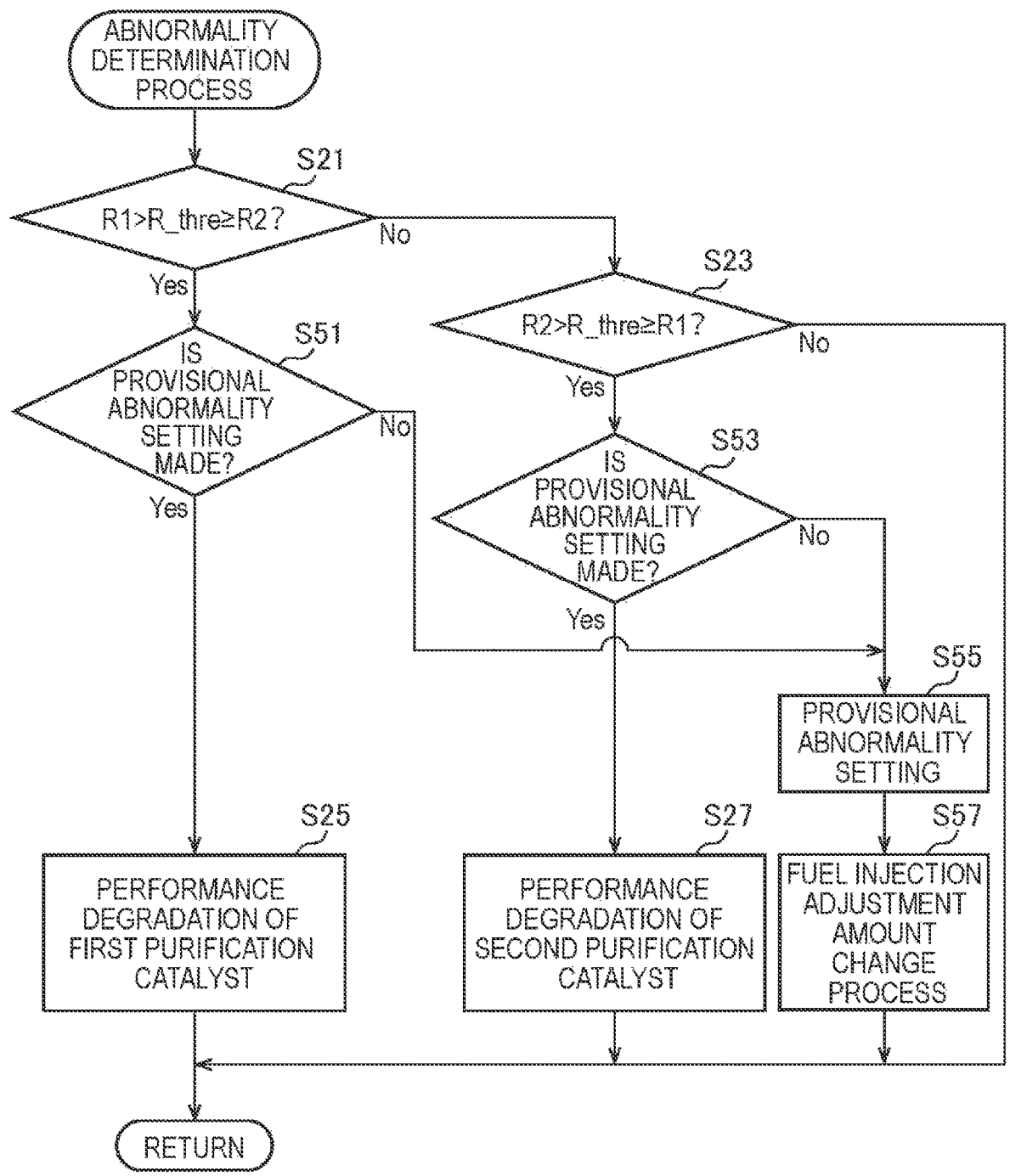
FIG. 11 is a flowchart illustrating a fourth instance of the abnormality determination process of the catalyst abnormality diagnostic method according to the example.

FIG. 11 is a flowchart illustrating a fourth instance of the abnormality determination process. In the fourth instance, the abnormality determination module 57 makes a provisional abnormality setting in a case in which not only the second purification catalyst 35 but also the first purification catalyst 33 is once determined to have been degraded, performs second abnormality diagnosis by changing the fuel injection adjustment amount dQ, and confirms that performance thereof has been degraded.

First, the abnormality determination module 57 determines whether the first determination value R1 exceeds the determination reference value R_thre and the second determination value R2 is equal to or smaller than the determination reference value R_thre (Step S21). In the case in which the relation of R1>R_thre≥R2 is satisfied (Yes in S21), the abnormality determination module 57 determines whether the provisional abnormality setting for performance degradation of the first purification catalyst 33 is made (Step S51). The provisional abnormality setting is information set in Step S55 in a case in which it is once determined that there is concern of performance degradation of the first purification catalyst 33. In a case in which the provisional abnormality setting is not made (No in S51), the abnormality determination module 57 regards that there is concern of performance degradation of the first purification catalyst 33 and then makes the provisional abnormality setting (Step S55). The abnormality determination module 57 may perform a process of setting, for example, a provisional abnormality flag.

On the other hand, in the case in which the relation of R1>R_thre≥R2 is not satisfied (No in S21), the abnormality determination module 57 determines whether the second determination value R2 exceeds the determination reference value R_thre and the first determination value R1 is equal to or smaller than the determination reference value R_thre (Step S23). In the case in which the relation of R2>R_thre≥R1 is not satisfied (No in S23), the abnormality determination module 57 determines neither the first purification catalyst 33 nor the second purification catalyst 35 is abnormal and ends the abnormality determination process.

On the other hand, in the case in which the relation of R2>R_thre≥R1 is satisfied (Yes in S23) in the fourth instance, the abnormality determination module 57 determines whether the provisional abnormality setting for performance degradation of the second purification catalyst 35 is made (Step S53). The provisional abnormality setting is information set in Step S55 in the case in which it is once determined that there is concern of performance degradation of the second purification catalyst 35. In a case in which the provisional abnormality setting is not made (No in S53), the abnormality determination module 57 regards that there is concern of performance degradation of the second purification catalyst 35 and makes the provisional abnormality setting (Step S55). The abnormality determination module 57 may perform a process of setting, for example, a provisional abnormality flag.

In the case in which the provisional abnormality setting is made in Step S55, the abnormality determination module 57 changes the fuel injection adjustment amount dQ (Step S57). The abnormality determination module 57 may determine whether there is an abnormality in the second purification catalyst 35 again, for example, by lowering the average value of the fuel injection adjustment amount dQ, similarly to the above-described Step S33. In addition, the abnormality determination module 57 may determine whether there is an abnormality in the second purification catalyst 35 again by enlarging the difference between the fuel injection adjustment amount dQ in the rich state and the fuel injection adjustment amount dQ in the lean state. Furthermore, the abnormality determination module 57 may determine whether there is an abnormality in the second purification catalyst 35 again by switching the fuel injection adjustment amounts dQ so that the period in which the rich state and the lean state of exhaust gas are repeated is enlarged.

In the case in which the relation of R1>R_thre≥R2 is satisfied again in Step S21 (Yes in S21) after passing through Step S51 and Step S55, the abnormality determination module 57 determines that the provisional abnormality setting has been made in Step S51 (Yes in S51) and confirms that the performance of the first purification catalyst 33 has been degraded (Step S25). In addition, in the case in which the relation of R2>R_thre≥R1 is satisfied again in Step S23 (Yes in S23) after passing through Step S51 and Step S55, the abnormality determination module 57 determines that the provisional abnormality setting has been made in Step S53 (Yes in S53) and confirms that the performance of the second purification catalyst 35 has been degraded (Step S27). That is, in the fourth instance of the abnormality determination process, the presence of abnormalities in the first purification catalyst 33 and the second purification catalyst 35 is determined by changing the fuel injection adjustment amount dQ so that clearer determination results is obtained, and therefore reliability of the abnormality diagnosis results of the first purification catalyst 33 and the second purification catalyst 35 can be improved.

(Fifth Instance)

Figure 12:
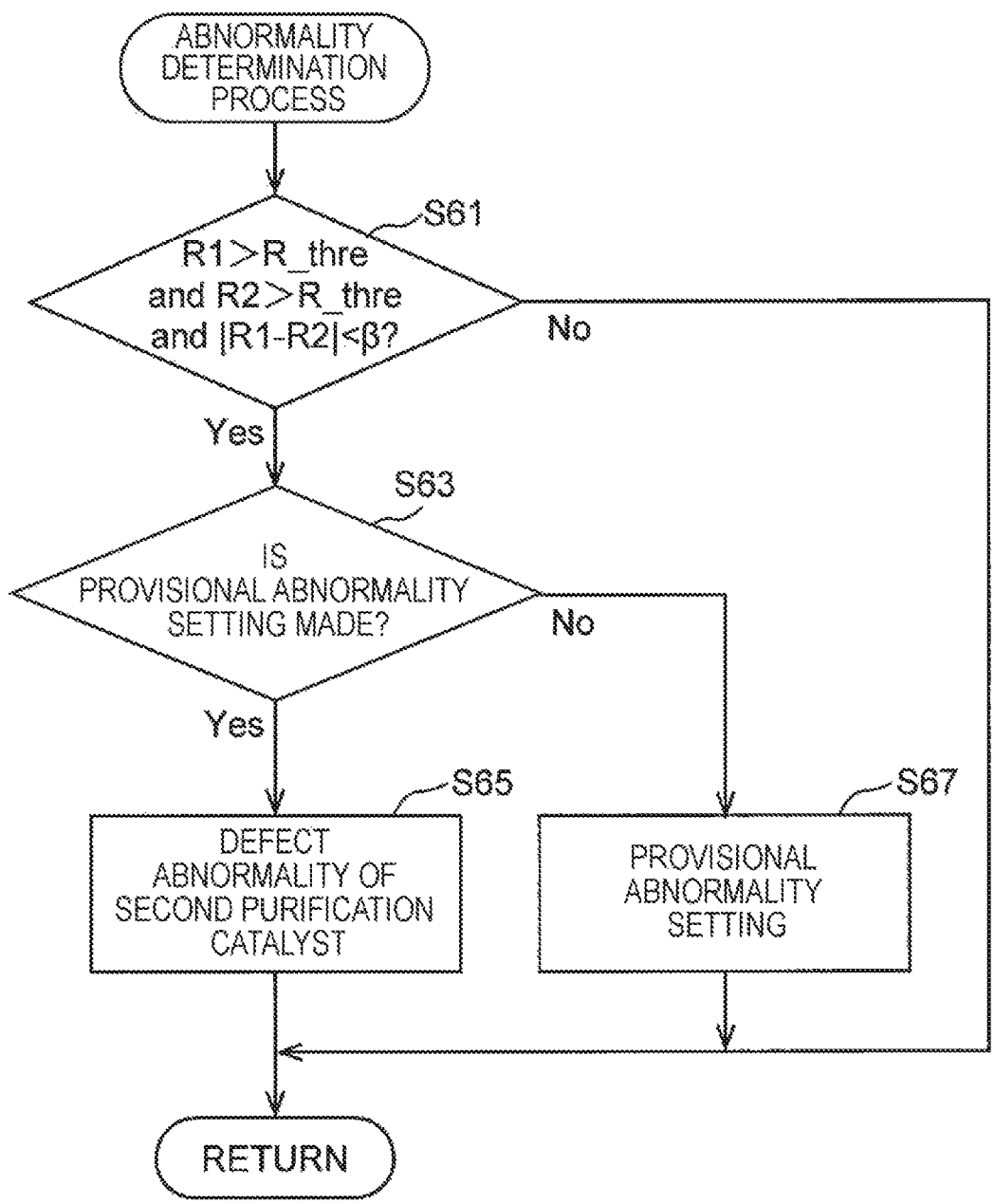
FIG. 12 is a flowchart illustrating a fifth instance of the abnormality determination process of the catalyst abnormality diagnostic method according to the example.

FIG. 12 is a flowchart illustrating a fifth instance of the abnormality determination process. In the first to fourth instances of the abnormality determination process described so far, whether performance degradation of the purification catalysts has occurred is mainly determined. On the other hand, in the fifth instance of the abnormality determination process, whether there is a defect abnormality in the second purification catalyst 35 is mainly determined. If, for example, the second purification catalyst 35 is placed at a high temperature and exposed to high heat as trapped PMs burn, there is concern of a GPF also serving as a catalyst carrier being defective. In this case, the function as a catalyst and the function as a GPF are lost and exhaust purification performance deteriorates, and therefore, determination of a defect abnormality of the second purification catalyst 35 becomes important likewise.

First, the abnormality determination module 57 determines whether both of the first determination value R1 and the second determination value R2 exceed the determination reference value R_thre and the absolute value of the difference between the first determination value R1 and the second determination value R2 is smaller than a threshold value (a second threshold value) β set in advance (Step S61). In the case in which the second purification catalyst 35 is defective, exhaust gas that arrives at the second purification catalyst 35 flows out to the downstream side of the second purification catalyst 35 being maintained at an amount of oxygen, and thus the second state value D2 detected by the second exhaust sensor 43 provided at the upstream part of the second purification catalyst 35 and the third state value D3 detected by the third exhaust sensor 45 provided at the downstream part of the second purification catalyst 35 indicate substantially the same value. For this reason, the first determination value R1 and the second determination value R2 have an equivalent value. In this case, both of the first determination value R1 and the second determination value R2 exceed the determination reference value R_thre. The threshold value β is appropriately set to, for example, a value close to zero taking an error into consideration.

In a case in which the relation of R1>R_thre and R2>R_thre and |R1−R2|<β is not satisfied (No in S61), the abnormality determination module 57 ends the abnormality determination process by determining that there is no defect abnormality in the second purification catalyst 35. On the other hand, the relation of R1>R_thre and R2>R_thre and

|R1−R2|<β is satisfied (Yes in S61), the abnormality determination module 57 determines whether a provisional abnormality setting for a defect abnormality of the second purification catalyst 35 is made (Step S63). The provisional abnormality setting is information set in Step S67 in a case in which it is once determined that there is concern of a defect abnormality occurring in the second purification catalyst 35. In a case in which no provisional abnormality setting is made (No in S63), the abnormality determination module 57 regards that there is concern of a defect abnormality of the second purification catalyst 35 occurring, and thus makes the provisional abnormality setting (Step S67). The abnormality determination module 57 may perform a process of setting, for example, a provisional abnormality flag.

In the case in which the relation of R1>R_thre and R2>R_thre and |R1−R2|<β is satisfied again in Step S61 (Yes in S61) after passing through Step S67, the abnormality determination module 57 determines that the provisional abnormality setting is made in Step S63 (Yes in S63) and confirms that there is a defect abnormality in the second purification catalyst 35 (Step S65). In the fifth instance of the abnormality determination process, the presence of a defect abnormality of the second purification catalyst 35 is determined at least twice, and thus reliability of the determination result of the presence of a defect abnormality of the second purification catalyst 35 can be improved. Note that a defect abnormality of the second purification catalyst 35 may be confirmed through one determination by omitting Step S63 and Step S67.

Figure 13:
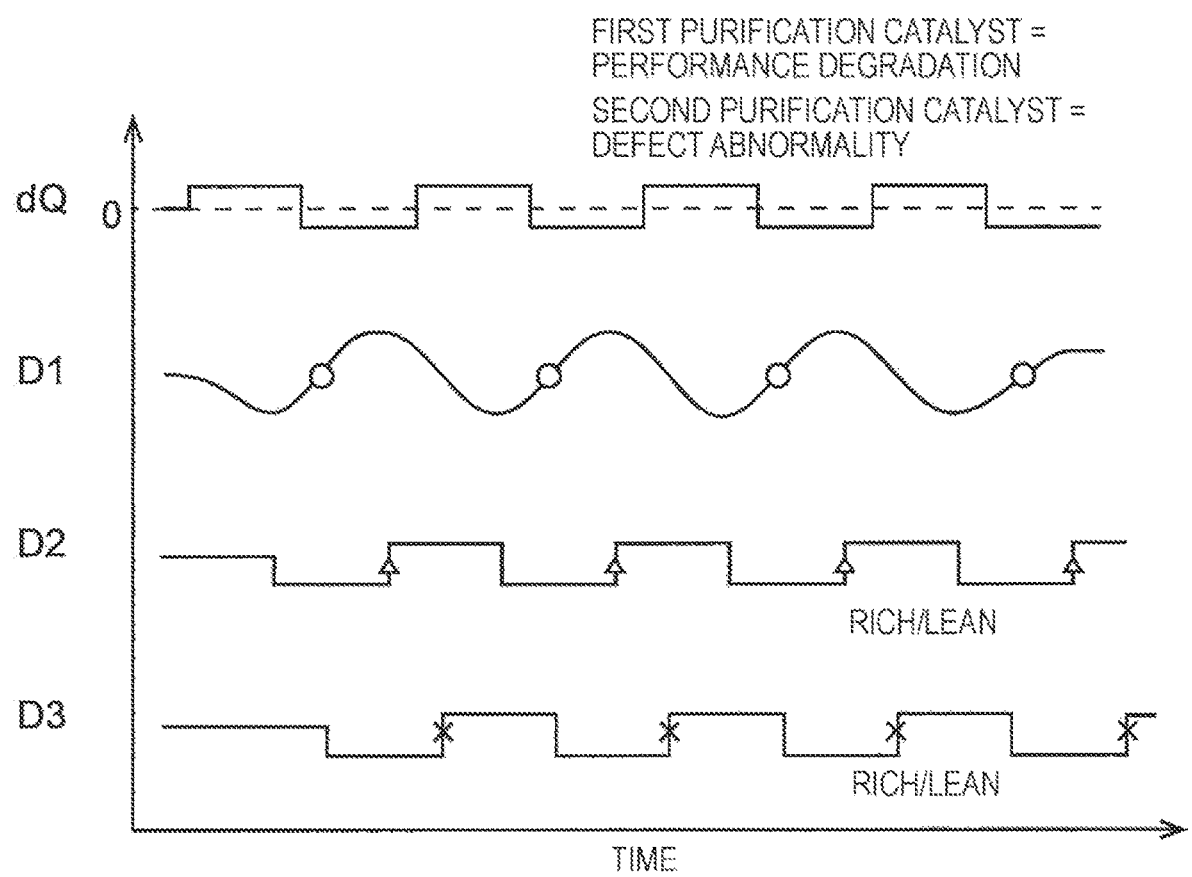
FIG. 13 is an explanatory diagram illustrating sensor values in a case in which the first purification catalyst exhibits performance degradation and the second purification catalyst exhibits a defect abnormality.

FIG. 13 illustrates a case in which the first purification catalyst 33 exhibits performance degradation and the second purification catalyst 35 exhibits a defect abnormality. If the fuel injection adjustment amount dQ is set to repeatedly have a positive value and a negative value at regular intervals, the first state value D1 detected by the first exhaust sensor 41 provided at the upstream part of the first purification catalyst 33 repeatedly increases or decreases in accordance with switches of the air-fuel ratio of exhaust gas between the rich state and the lean state. In a case in which there is performance degradation occurring in the first purification catalyst 33, the oxygen storage capacity of the first purification catalyst 33 decreases and the outflow of oxygen to the downstream side of the first purification catalyst 33 is repeated. Thus, the second state value D2 detected by the second exhaust sensor 43 provided at the downstream part of the first purification catalyst 33 repeatedly has a value indicating the rich state and a value indicating the lean state.

In addition, in a case in which there is a defect abnormality occurring in the second purification catalyst 35, the amount of oxygen at the upstream part and the amount of oxygen at the downstream part of the second purification catalyst 35 are substantially equal. Thus, the third state value D3 detected by the third exhaust sensor 45 provided at the downstream part of the second purification catalyst 35 shows a similar change to the second state value D2 except that there is a time difference therebetween. That is, in the case in which there is a defect abnormality occurring in the second purification catalyst 35, the second state value D2 and the third state value D3 show a similar change.

The first determination value R1 that is a ratio of the number of times the second state value D2 switches from the lean state to the rich state (the number of triangles in the drawing) to the number of times the first state value D1 switches from the lean state to the rich state (the number of white circles in the drawing) is equal to the second determination value R2 that is a ratio of the number of times the third state value D3 switches from the lean state to the rich state (the number of X symbols in the drawing) to the number of times the first state value D1 switches from the lean state to the rich state (the number of white circles in the drawing). In this case, the performance of the first purification catalyst 33 and the second purification catalyst 35 may be degraded, and thus the first determination value R1 and the second determination value R2 exceed the determination reference value R_thre. Therefore, both of the first determination value R1 and the second determination value R2 exceed the determination reference value R_thre, the difference between the first determination value R1 and the second determination value R2 is less than the threshold value β, and thus it is determined that there is a defect abnormality occurring in the second purification catalyst 35.

Figure 14:
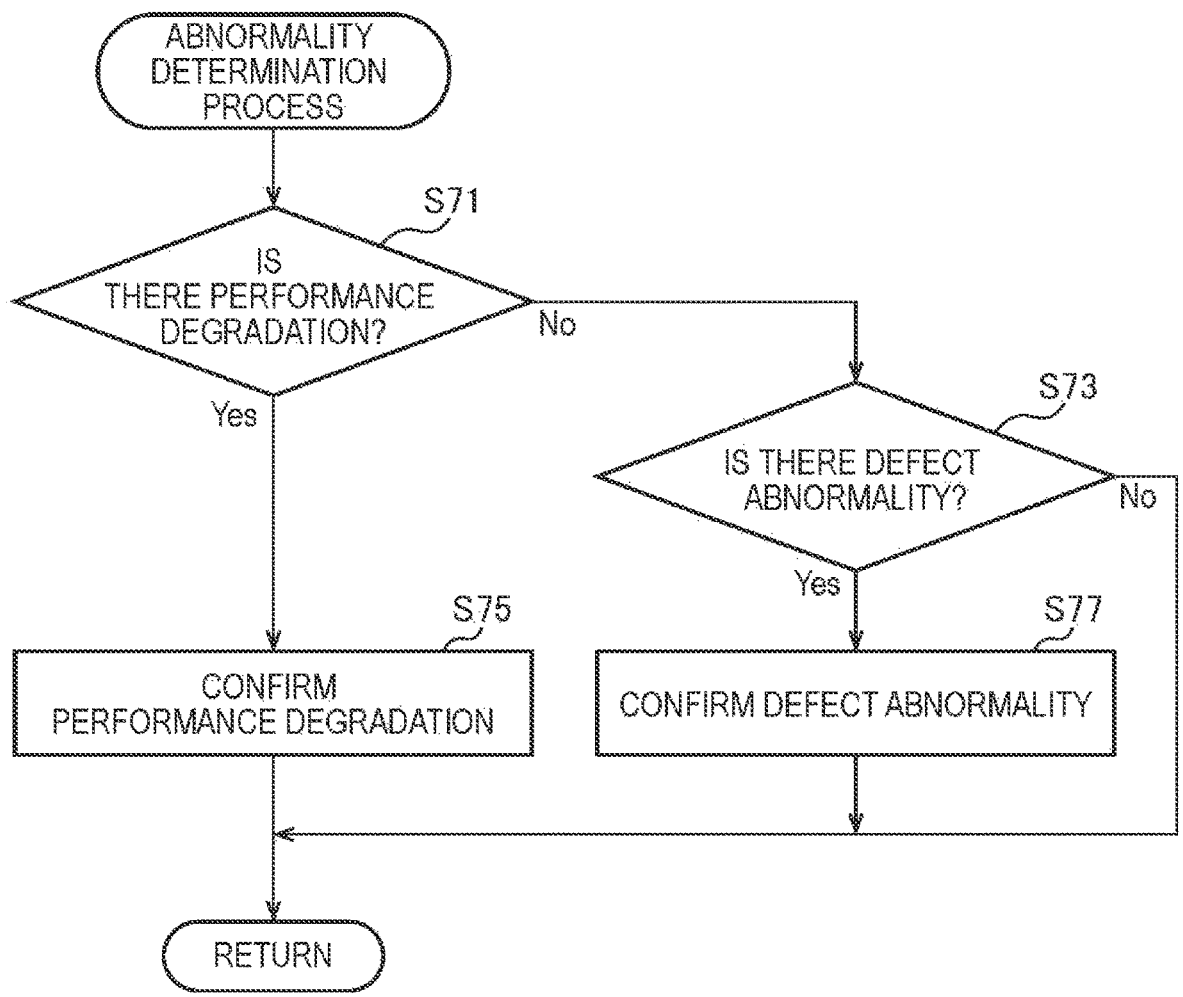
FIG. 14 is a flowchart illustrating an instance in which performance degradation determination of a purification catalyst is prioritized over defect abnormality determination thereof.

Note that, even if it is determined that there is a defect abnormality occurring in the second purification catalyst 35 in the fifth instance, in a case in which it is determined that the performance of the purification catalyst is degraded through the first to fourth instances, a diagnosis result may be confirmed by giving priority to the determination result of the performance degradation. FIG. 14 is a flowchart illustrating an instance of a process of preferentially confirming performance degradation of a purification catalyst.

The abnormality determination module 57 executes any of the first to fourth instances of the abnormality determination process and determines whether one or both of the first purification catalyst 33 and the second purification catalyst 35 show performance degradation after executing the fifth instance of the abnormality determination process (Step S71). In a case in which there is performance degradation occurring in a purification catalyst (Yes in S71), the abnormality determination module 57 confirms performance degradation of the purification catalyst regardless of whether there is a defect abnormality occurring in the second purification catalyst 35 (Step S75). On the other hand, in a case in which there is no performance degradation occurring in a purification catalyst (No in S71), the abnormality determination module 57 determines whether there is a defect abnormality occurring in the second purification catalyst 35 (Step S73). In a case in which there is a defect abnormality occurring in the second purification catalyst 35 (Yes in S73), the abnormality determination module 57 confirms the defect abnormality of the second purification catalyst 35 (Step S77). On the other hand, in a case in which there is no defect abnormality occurring in the second purification catalyst 35 (No in S73), the abnormality determination module 57 regards that there is no abnormality in the first purification catalyst 33 and the second purification catalyst 35, and ends the abnormality determination process.

Note that, although the first determination value R1 and the second determination value R2 are obtained using the numbers of times in which the first state value D1, the second state value D2, and the third state value D3 switch from the lean state to the rich state in the first to fifth instances, the first determination value R1 may be a ratio of a wavelength of the second state value D2 to a wavelength of the first state value D1. In addition, the second determination value R2 may be a ratio of a wavelength of the third state value D3 to the wavelength of the first state value D1. Furthermore, the first determination value R1 may be a ratio of an integral value of the second state value D2 to an integral value of the first state value D1. In addition, the second determination value R2 may be a ratio of an integral value of the third state value D3 to the integral value of the first state value D1.

As described above, the catalyst abnormality diagnostic device 50 according to the present example generates a diagnostic state by adjusting a fuel injection amount so that an air-fuel ratio of exhaust gas is repeatedly in the rich state and the lean state, obtains the first determination value R1 indicating catalytic performance of the first purification catalyst 33 on the basis of the first state value D1 related to the air-fuel ratio of the upstream part of the first purification catalyst 33 and the second state value D2 related to the air-fuel ratio of the downstream part of the first purification catalyst 33, obtains the second determination value R2 indicating catalytic performance of the second purification catalyst 35 on the basis of the first state value D1 and the third state value D3 related to the air-fuel ratio of the downstream part of the second purification catalyst 35, and determines whether there is an abnormality in one or both of the first purification catalyst 33 and the second purification catalyst 35 on the basis of the first determination value R1, the second determination value R2, and the determination reference value R_thre. Accordingly, even in a case in which the second purification catalyst 35 is a catalyst having the oxygen storage capacity and the function of a GPF and the second purification catalyst 35 is degraded more than the first purification catalyst 33, the degradation can be detected.

In addition, in the case in which the catalyst abnormality diagnostic device 50 according to the present example once determines that there is an abnormality occurring in a catalyst, then makes abnormality diagnosis by changing the fuel injection adjustment amount dQ, and then determines again that there has been an abnormality in a catalyst and confirms that the abnormality of the catalyst, reliability of the abnormality diagnosis result can be improved.

In addition, in the case in which the catalyst abnormality diagnostic device 50 according to the present example once determines that there is an abnormality occurring in a catalyst, then change the fuel injection adjustment amount dQ so that the amount of oxygen that arrives at the second purification catalyst 35 increases to perform abnormality diagnosis, reliability of the abnormality diagnosis result with respect to the second purification catalyst 35 can be improved.

According to the above-described present example, in the case in which a purification catalyst in which a catalyst component is carried by a particulate filter is used as a downstream-side purification catalyst among two purification catalysts provided in the exhaust passage, whether there is an abnormality in the two purification catalysts can be determined.

Although the preferred examples of the present invention have been described in detail with reference to the appended drawings, the present invention is not limited thereto. It is obvious to those skilled in the art that various modifications or variations are possible insofar as they are within the technical scope of the appended claims or the equivalents thereof. It should be understood that such modifications or variations are also within the technical scope of the present invention.

The invention claimed is:

1. A catalyst abnormality diagnostic device configured to diagnose an abnormality of a first purification catalyst having an oxygen storage capacity provided on an exhaust passage of a combustion engine and a second purification catalyst having the oxygen storage capacity and a function of a particulate filter provided on an exhaust passage on a downstream side of the first purification catalyst, the catalyst abnormality diagnostic device comprising:

a fuel injection controller configured to generate a diagnostic state by adjusting a fuel injection amount so that an air-fuel ratio of an exhaust gas is repeatedly in a rich state and a lean state;
a processor configured to:
obtain a first determination value indicating a catalytic performance of the first purification catalyst on the basis of
a first state value, obtained from a first sensor disposed upstream relative to the first purification catalyst, related to an air-fuel ratio of an upstream part of the first purification catalyst and
a second state value, obtained from a second sensor disposed downstream relative to the first purification catalyst and upstream relative to the second purification catalyst, related to an air-fuel ratio of a downstream part of the first purification catalyst in the diagnostic state;
obtain a second determination value indicating a catalytic performance of the second purification catalyst on the basis of
the first state value and
a third state value, obtained from a third sensor disposed downstream relative to the second purification catalyst, related to an air-fuel ratio of a downstream part of the second purification catalyst in the diagnostic state; and
determine whether there is an abnormality in one or both of the first purification catalyst and the second purification catalyst on the basis of the first determination value, the second determination value, and a predetermined determination reference value.

2. The catalyst abnormality diagnostic device according to claim 1,
wherein the processor
determines a performance degradation of the first purification catalyst in a case in which the first determination value exceeds the determination reference value and the second determination value is equal to or smaller than the determination reference value, and
determines a performance degradation of the second purification catalyst in a case in which the second determination value exceeds the determination reference value and the first determination value is equal to or smaller than the determination reference value.

3. The catalyst abnormality diagnostic device according to claim 1, wherein, in a case in which it is determined that there is an abnormality occurring in one or both of the first purification catalyst and the second purification catalyst, the processor determines whether there is the abnormality in a diagnostic state in which a fuel injection adjustment amount is changed and confirms the abnormality in a case in which it is determined again that there is an abnormality occurring.

4. The catalyst abnormality diagnostic device according to claim 2, wherein, in a case in which the performance degradation of the second purification catalyst is determined after the performance degradation of the first purification catalyst is determined or the performance degradation of the first purification catalyst is determined after the performance degradation of the second purification catalyst is determined, the processor determines whether there is an abnormality again and confirms whether there is the performance degradation of both or either of the first purification catalyst and the second purification catalyst.

5. The catalyst abnormality diagnostic device according to claim 1, wherein, in a case in which the first determination value is equal to or smaller than the determination reference value and the second determination value exceeds the determination reference value, the processor determines whether there is an abnormality in the second purification catalyst again by lowering an average value of a fuel injection adjustment amount.

6. The catalyst abnormality diagnostic device according to claim 1, wherein, in a case in which the first determination value is equal to or smaller than the determination reference value and the second determination value exceeds the determination reference value, the processor determines whether there is an abnormality in the second purification catalyst again by enlarging a difference between a fuel injection adjustment amount in the rich state and a fuel injection adjustment amount in the lean state.

7. The catalyst abnormality diagnostic device according to claim 1, wherein, in a case in which the first determination value is equal to or smaller than the determination reference value and the second determination value exceeds the determination reference value, the processor determines whether there is an abnormality in the second purification catalyst again by enlarging a period in which the rich state and the lean state are repeated.

8. The catalyst abnormality diagnostic device according to claim 1, wherein, in a case in which a difference between the first determination value and the second determination value is less than a first threshold value, the processor determines whether there is an abnormality in the first purification catalyst and the second purification catalyst again by lowering an average value of a fuel injection adjustment amount.

9. The catalyst abnormality diagnostic device according to claim 1, wherein, in a case in which a difference between the first determination value and the second determination value is less than a first threshold value, the processor determines whether there is an abnormality in the first purification catalyst and the second purification catalyst again by enlarging a difference between a fuel injection adjustment amount in the rich state and a fuel injection adjustment amount in the lean state.

10. The catalyst abnormality diagnostic device according to claim 1, wherein, in a case in which a difference between the first determination value and the second determination value is less than a first threshold value, the processor determines whether there is an abnormality in the first purification catalyst and the second purification catalyst again by enlarging a period in which the rich state and the lean state are repeated.

11. The catalyst abnormality diagnostic device according to claim 1, wherein, in a case in which one or both of the first determination value and the second determination value exceed the determination reference value, the processor determines whether there is an abnormality again by lowering an average value of a fuel injection adjustment amount and confirms the abnormality of the corresponding purification catalyst.

12. The catalyst abnormality diagnostic device according to claim 1, wherein, in a case in which one of the first determination value and the second determination value exceeds the determination reference value, the processor determines whether there is an abnormality again by enlarging a difference between a fuel injection adjustment amount in the rich state and a fuel injection adjustment amount in the lean state and confirms the abnormality of the corresponding purification catalyst.

13. The catalyst abnormality diagnostic device according to claim 1, wherein, in a case in which one of the first determination value and the second determination value exceeds the determination reference value, the processor determines whether there is an abnormality again by enlarging a period in which the rich state and the lean state are repeated and confirms the abnormality of the corresponding purification catalyst.

14. The catalyst abnormality diagnostic device according to claim 1, wherein, in a case in which both of the first determination value and the second determination value exceed the determination reference value and an absolute value of a difference between the first determination value and the second determination value is less than a second threshold value, the processor determines a defect abnormality of the second purification catalyst.

15. The catalyst abnormality diagnostic device according to claim 14, wherein, in a case in which both of the first determination value and the second determination value exceed the determination reference value and the absolute value of the difference between the first determination value and the second determination value is less than the second threshold value, the processor determines whether there is an abnormality again by lowering an average value of a fuel injection adjustment amount and confirms the defect abnormality of the second purification catalyst.

16. The catalyst abnormality diagnostic device according to claim 14, wherein, in a case in which both of the first determination value and the second determination value exceed the determination reference value and the absolute value of the difference between the first determination value and the second determination value is less than the second threshold value, the processor determines whether there is an abnormality again by enlarging a difference between a fuel injection adjustment amount in the rich state and a fuel injection adjustment amount in the lean state and confirms the defect abnormality of the second purification catalyst.

17. The catalyst abnormality diagnostic device according to claim 14, wherein, in a case in which both of the first determination value and the second determination value exceed the determination reference value and the absolute value of the difference between the first determination value and the second determination value is less than the second threshold value, the processor determines whether there is an abnormality again by enlarging a period in which the rich state and the lean state are repeated and confirms the defect abnormality of the second purification catalyst.

18. The catalyst abnormality diagnostic device according to claim 14, wherein, in a case in which the performance degradation of one or both of the first purification catalyst and the second purification catalyst and the defect abnormality of the second purification catalyst are determined together, the processor preferentially confirms the determination of the performance degradation.

19. A catalyst abnormality diagnostic method of diagnosing an abnormality of a first purification catalyst having an oxygen storage capacity provided on an exhaust passage of a combustion engine and a second purification catalyst having the oxygen storage capacity and a function of a particulate filter provided on an exhaust passage on a downstream side of the first purification catalyst, the catalyst abnormality diagnostic method comprising:
generating a diagnostic state by adjusting a fuel injection amount so that an air-fuel ratio of an exhaust gas is repeatedly in a rich state and a lean state;
obtaining a first determination value indicating a catalytic performance of the first purification catalyst on the basis of
a first state value, obtained from a first sensor disposed upstream relative to the first purification catalyst, related to an air-fuel ratio of an upstream part of the first purification catalyst and a second state value, obtained from a second sensor disposed downstream relative to the first purification catalyst and upstream relative to the second purification catalyst, related to an air-fuel ratio of a downstream part of the first purification catalyst in the diagnostic state;

obtaining a second determination value indicating a catalytic performance of the second purification catalyst on the basis of the first state value and a third state value, obtained from a third sensor disposed downstream relative to the second purification catalyst, related to an air-fuel ratio of a downstream part of the second purification catalyst in the diagnostic state; and determining whether there is an abnormality in one or both of the first purification catalyst and the second purification catalyst on the basis of the first determination value, the second determination value, and a predetermined determination reference value.

20. A catalyst abnormality diagnostic device configured to diagnose an abnormality of a first purification catalyst having an oxygen storage capacity provided on an exhaust passage of a combustion engine and a second purification catalyst having the oxygen storage capacity and a function of a particulate filter provided on an exhaust passage on a downstream side of the first purification catalyst, the catalyst abnormality diagnostic device comprising:

circuitry configured to generate a diagnostic state by adjusting a fuel injection amount so that an air-fuel ratio of an exhaust gas is repeatedly in a rich state and a lean state, obtain a first determination value indicating a catalytic performance of the first purification catalyst on the basis of a first state value, obtained from a first sensor disposed upstream relative to the first purification catalyst, related to an air-fuel ratio of an upstream part of the first purification catalyst and a second state value, obtained from a second sensor disposed downstream relative to the first purification catalyst and upstream relative to the second purification catalyst, related to an air-fuel ratio of a downstream part of the first purification catalyst in the diagnostic state, obtain a second determination value indicating a catalytic performance of the second purification catalyst on the basis of the first state value and a third state value, obtained from a third sensor disposed downstream relative to the second purification catalyst, related to an air-fuel ratio of a downstream part of the second purification catalyst in the diagnostic state, and determine whether there is an abnormality in one or both of the first purification catalyst and the second purification catalyst on the basis of the first determination value, the second determination value, and a predetermined determination reference value.

* * * * *